United States Patent [19]
Briggs et al.

[11] Patent Number: 5,338,993
[45] Date of Patent: Aug. 16, 1994

[54] MOTOR APPARATUS

[75] Inventors: Edward R. Briggs, Fullerton; Gary H. Daebelliehn, Buena Park; Peter S. Winzen, Hermosa Beach; Donald R. Bellgraph, Gardena, all of Calif.

[73] Assignee: Eaton Corporation, Cleveland, Ohio

[21] Appl. No.: 24,686

[22] Filed: Mar. 1, 1993

[51] Int. Cl.$^5$ .............................................. H02K 7/06
[52] U.S. Cl. ........................................ 310/82; 310/83
[58] Field of Search ............... 310/82, 83, 67 R, 89, 310/103, 120, 184, 185, 254, 268; 318/40, 41, 85

[56] References Cited

U.S. PATENT DOCUMENTS

| | | | |
|---|---|---|---|
| Re. 29,411 | 9/1970 | Newell | 310/82 |
| 3,530,322 | 9/1970 | Newell | 310/82 |
| 4,303,871 | 12/1981 | Berry | 318/138 |
| 4,330,725 | 5/1982 | Hintz | 310/82 |
| 4,360,752 | 11/1982 | Morgan | 310/82 |
| 4,436,278 | 3/1984 | Smith | 251/130 |
| 4,541,609 | 9/1985 | Smith | 251/129.11 |
| 4,583,016 | 4/1986 | Ban et al. | 310/154 |
| 4,906,881 | 3/1990 | Knight | 310/83 |

*Primary Examiner*—Steven L. Stephan
*Assistant Examiner*—Matthew Nguyen
*Attorney, Agent, or Firm*—Tarolli, Sundheim & Covell

[57] ABSTRACT

An improved motor apparatus includes five motor coils which are connected with a stator and are sequentially energizeable to cause a rotor to nutate and rotate relative to the stator. Control circuitry includes an upper transistor and a lower transistor which are connected with opposite ends of a motor coil. The upper transistor is rendered nonconducting and current is conducted from one end of the motor coil through the lower transistor back to the motor coil to maintain the motor coil energized. A holding circuit is effective to energize one of the coils to maintain gear teeth on the stator and rotor in meshing engagement to hold the rotor against movement to relative to the stator. Annular rim surface areas on the stator and rotor are maintained in abutting engagement during nutation and rotation of the rotor relative to the stator and during holding of the rotor stationary with the gear teeth in meshing engagement. Upon de-energization of all of the motor coils, a biasing spring is effective to rotate the rotor relative to the stator to move the rotor back toward an initial position relative to the stator.

66 Claims, 6 Drawing Sheets

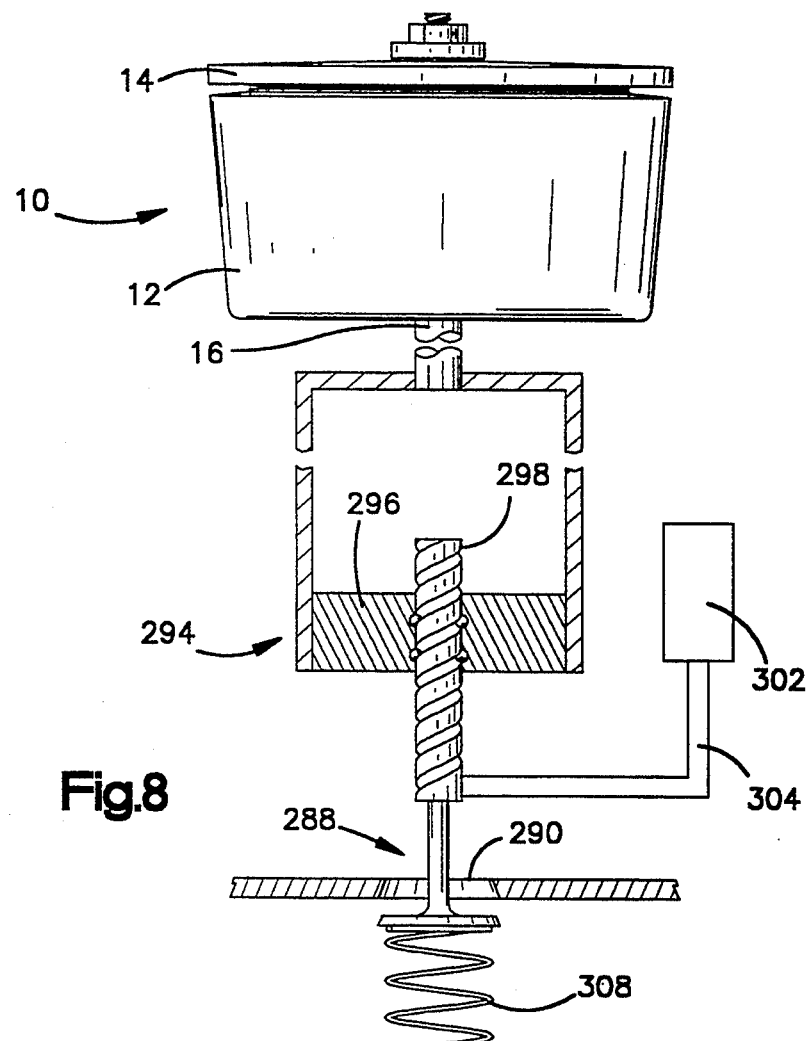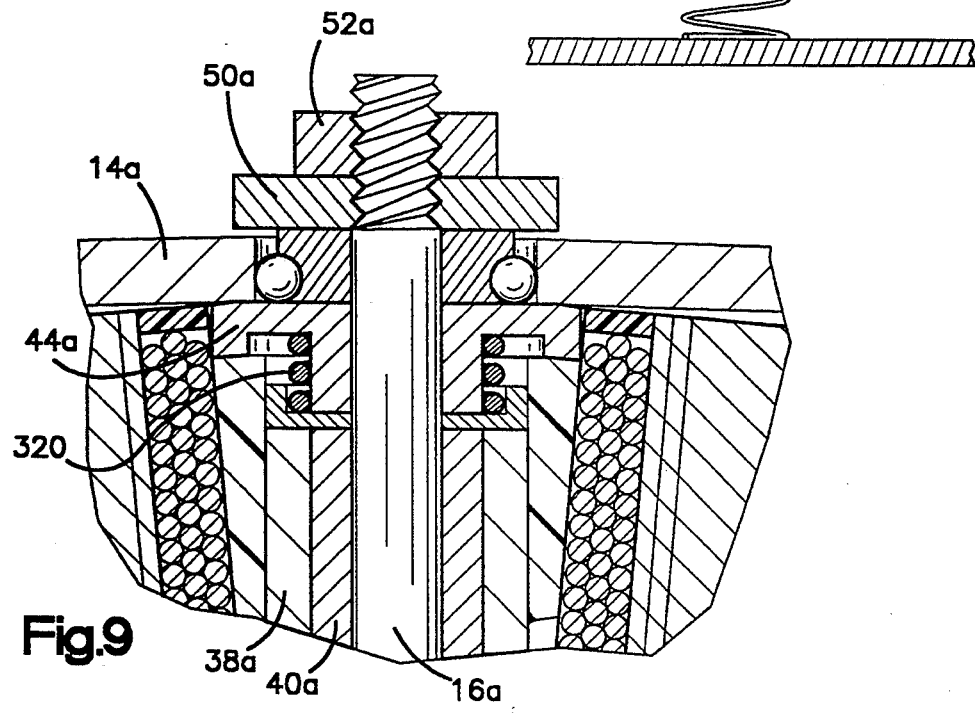

5,338,993

MOTOR APPARATUS

BACKGROUND OF THE INVENTION

The present invention relates to a new and improved motor and motor control circuitry and more specifically to a nutating motor having a plurality of motor coils and control circuitry for controlling energization of the motor coils.

A known nutating motor is disclosed in U.S. Pat. No. 4,330,725 issued May 18, 1982 and entitled "Nutating Motor Coupling". The nutating motor disclosed in this patent includes a plurality of motor coils disposed on a stator having an upwardly facing annular array of gear teeth. A rotor is fixedly connected with a motor output shaft and has a downwardly facing annular array of gear teeth. Upon sequential energization of the motor coils, the rotor is tilted relative to the stator to move the annular arrays of gear teeth into meshing engagement. Sequential energization of the motor coils causes the rotor to nutate relative to the stator. As the rotor nutates relative to the stator, the annular arrays of gear teeth cooperate to effect relative rotation between the rotor and the stator.

Control circuitry for a nutating motor is disclosed in U.S. Pat. No. 4,303,871 issued Dec. 1, 1981 and entitled "Nutating Motor Current Control". The control circuitry disclosed in this patent includes switches or Darlington amplifiers which are connected with opposite ends of motor coils. By sequentially operating the switches from a nonconducting condition to a conducting condition, the motor coils are sequentially energized to effect nutational and rotational movement of the rotor relative to the stator. The switches for any one of the motor coils are simultaneously operated from a nonconducting condition to a conducting condition to effect energization of the one motor coil and are subsequently simultaneously operated from the conducting condition to a nonconducting condition to effect de-energization of the one motor coil. As the one motor coil is de-energized, energy from the one motor coil is utilized to energize another motor coil.

Nutating motors have previously been utilized to operate many different devices including valves. One way of connecting a nutating motor with a valve is disclosed in U.S. Pat. No. 4,360,752 issued Nov. 23, 1982 and entitled "Nutating Motor Gate Valve Operator and Rotor Assembly". Another way of connecting a nutating motor with a valve is disclosed in U.S. Pat. No. 4,436,278 issued Mar. 13, 1984 and entitled "Disconnectable Valve Motor Drive".

SUMMARY OF THE INVENTION

The present invention relates to a motor apparatus which includes a stator having an annular array of gear teeth. A rotor is movable relative to the stator and has a second annular array of gear teeth. A plurality of motor coils are sequentially energizeable to cause the rotor to tilt and then move relative to the stator with the annular arrays of gear teeth in meshing engagement. During movement of the rotor relative to the stator, the meshing gear teeth cooperate to effect rotation of the rotor relative to the stator.

Control circuitry for effecting sequential energization of the motor coils includes a pair of switches for each of the coils. The switches connected with opposite ends of a coil are rendered conducting to effect energization of the coil. Thereafter, one of the switches is rendered nonconducting. Current flows from the coil through the conducting switch and back to the coil to maintain the coil in an energized condition.

Operation of the motor may be interrupted and a motor output shaft held against rotation by maintaining one of the motor coils energized. One of the switches associated with the motor coil to be energized is maintained in a conducting condition. The other switch associated with the motor coil to be energized is periodically operated to a conducting condition for a relatively short time and then operated to a nonconducting condition for a relatively long time. During the relatively long tee in which the one switch is in a nonconducting condition, current is conducted from the motor coil through the conducting switch back to the motor coil to maintain the motor coil in an energized condition.

During movement of the rotor relative to the stator, a magnetic flux field for the motor should be as strong as possible. In order to provide for minimal resistance to the flow of magnetic flux, the stator and rotor have surface areas which are maintained in abutting engagement during movement of the rotor relative to the stator. In addition, these surface areas are maintained in abutting engagement when the rotor is held stationary with the annular arrays of gear teeth in meshing engagement.

The operating characteristics of a motor are maximized by providing only five motor coils. The provision of five motor coils tends to maximize the pole surface area of the core around which a motor coil is disposed. If a greater number of motor coils is provided, the total pole surface area is reduced due to spacing between the motor coils. If the number of motor coils is less than five, smooth operation of the motor is impaired.

In one embodiment of the invention, the motor is connected with an apparatus having a biasing spring which urges the apparatus towards an initial condition. In this embodiment of the invention, all of the motor coils are de-energized to enable the rotor to freely rotate relative to the stator. The biasing spring then causes the rotor to move back toward an initial position as the apparatus moves toward its initial condition.

BRIEF DESCRIPTION OF THE DRAWINGS

The foregoing and other features of the present invention will become more apparent upon a consideration of the following description taken in connection with the accompanying drawings wherein:

FIG. 8 is a schematic illustration depicting the use of the motor assembly of FIGS. 1-3 in association with a valve; and FIG. 9 is an enlarged schematic illustration of a portion of a second embodiment of the nutating motor assembly of FIGS. 1-3.

DESCRIPTION OF SPECIFIC PREFERRED EMBODIMENTS OF THE INVENTION

Motor Assembly

Figure 1:
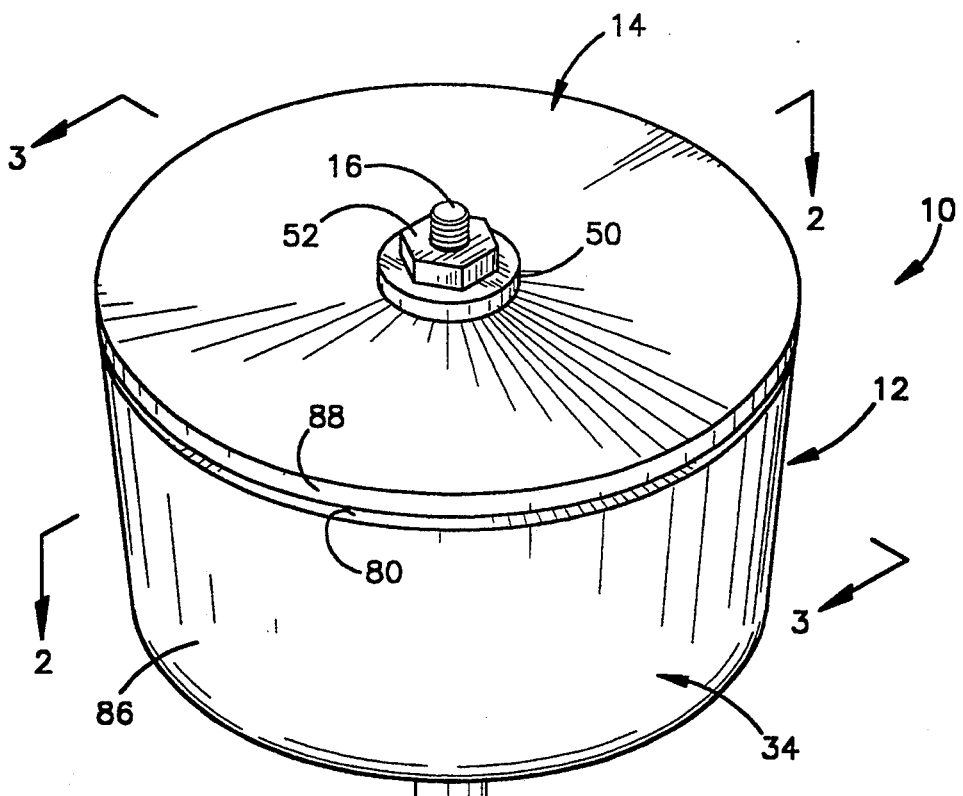
FIG. 1 is a schematic pictorial illustration of a nutating motor assembly constructed in accordance with the present invention.

A nutating motor assembly 10 (FIG. 1) includes a generally cylindrical stator 12 which is stationary. A circular rotor or armature 14 is movable relative to the stator 12 with a combined rotational and nutational motion. The rotor or armature 14 is connected to a rotatable motor output shaft 16.

A plurality of pole pieces 20, 22, 24, 26, and 28 (FIG. 2) are disposed in an annular array in an annular cheer 32 formed in a one-piece stator housing 34 (FIG. 3) formed of an iron-containing metal. The motor output shaft 16 extends through a cylindrical central wall 38 of the one-piece stator housing 34. The motor output shaft 16 is rotatably supported in the stator housing 34 by a bearing sleeve 40. An upper end portion of the bearing sleeve 40 abuts against an annular thrust washer 42. An annular rotor support member 44, formed of brass or other nonmagnetizeable material, abuts the thrust washer 42.

The rotor 14 is connected with the motor output shaft 16 by a plurality of ball bearings 46. The ball bearings 46 engage openings formed in a bearing retainer 48 and in the rotor 14. The bearing retainer 48 is keyed or otherwise fixedly connected to the motor output shaft 16 for rotation therewith. Inner and outer nuts 50 and 52 engage a threaded upper (as viewed in FIG. 3) end portion of the motor output shaft 16.

The thrust washer 42 is pressed against the upper (as viewed in FIG. 3) end of the bearing sleeve 40 and the central portion 38 of the stator housing 34 by the rotor support 44 and bearing retainer 48. The inner and outer nuts 50 and 52 firmly press the bearing retainer 48 against the rotor support 44. The manner in which the bearing sleeve 40, thrust washer 42 and bearing retainer 48 cooperate with the rotor 14 and stator 12 is generally the same as is disclosed in the aforementioned U.S. Pat. No. 4,330,725.

Figure 2:
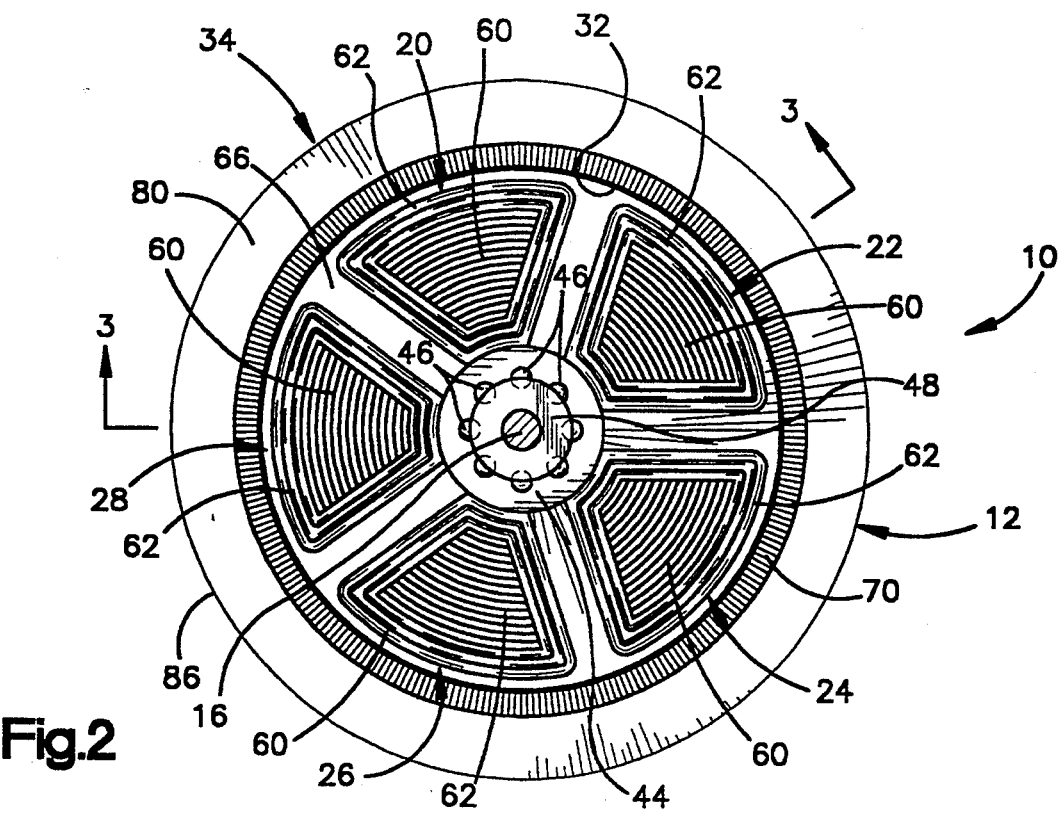
FIG. 2 is a plan view, taken generally along the line 2—2 of FIG. 1, illustrating a plurality of pole pieces in the nutating motor assembly.

In accordance with one of the features of the present invention, there are only five pole pieces 20, 22, 24, 26 and 28 (FIG. 2). By providing only five pole pieces 20-28, it is believed that the best possible compromise is obtained between the counteracting goals of maximizing the surface areas of the upper ends of the pole pieces and having a smoothly operating motor 10. Maximizing the surface areas of the upper ends of the pole pieces 20-28 maximizes the strength of the magnetic flux field to which the rotor 14 is exposed during operation of the motor 10. Since there is space between each of the pole pieces 20-28, minimizing the number of pole pieces tends to maximize the surface areas of the pole pieces and the operating force which can be exerted by the motor 10.

However, the smaller the number of pole pieces 20-28, the more irregular is the operation of the motor 10. In the past, six pole pieces have been used in nutating motors. However, it has been found that reducing the number of pole pieces to five increases the surface area of the upper end portions of the pole pieces to thereby increase the operating power of the motor. It has also been found that the use of only five pole pieces 20-28 does not result in the nutating motor 10 have objectionable irregularity during its operation.

The pole pieces 20-28 all have the same construction. The pole piece 28 has a laminated metal core 60 which is enclosed by a motor coil 62. It should be understood that although the motor coil 62 has been illustrated in FIGS. 2 and 3 as only having a few layers of windings, in actual practice, the motor coil 62 has a larger number of layers of windings. The pole pieces 20-28 are maintained in a spaced apart relationship in the chamber 32 by epoxy resin 66 which extends around the pole pieces.

Figure 3:
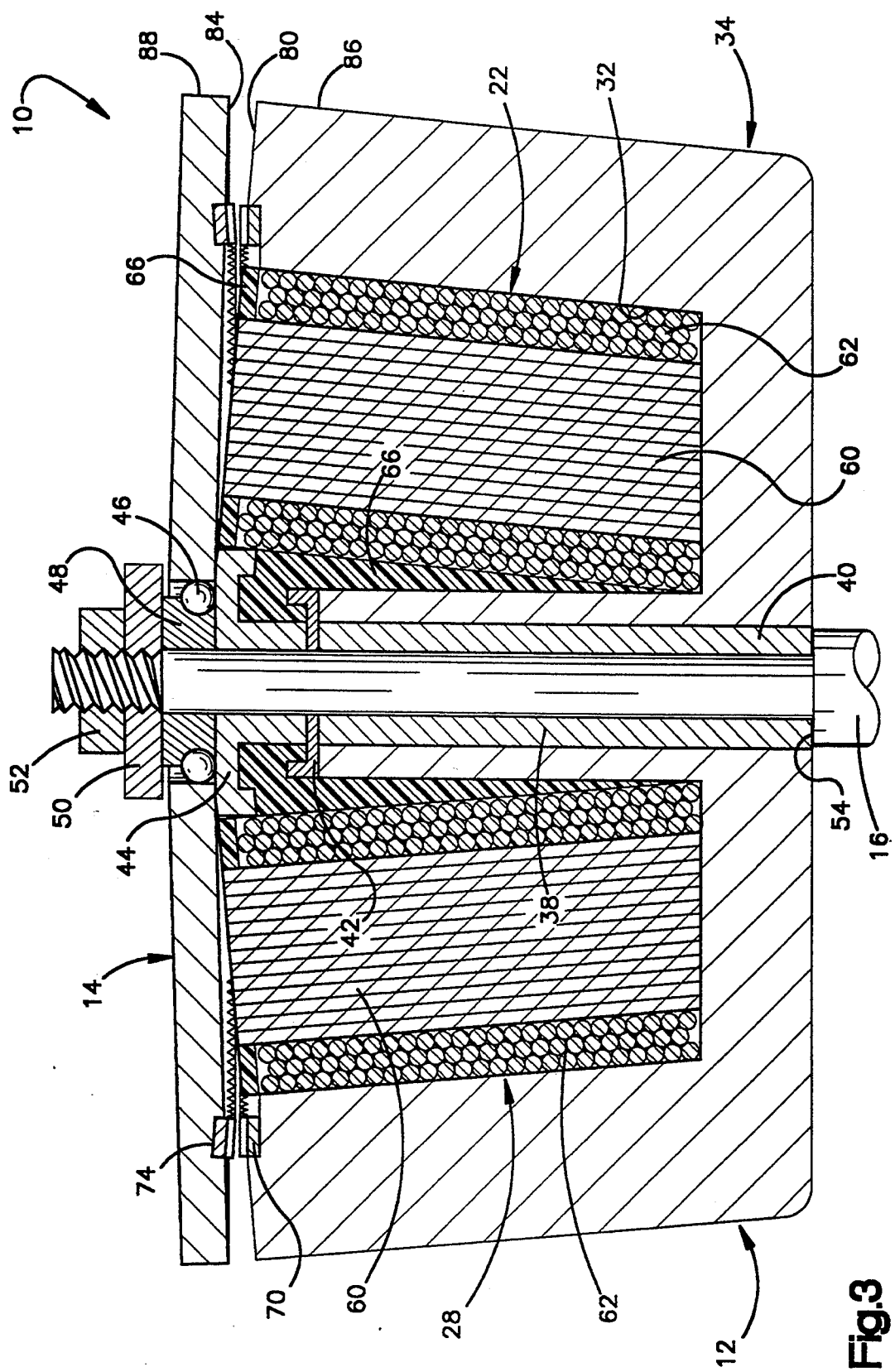
FIG. 3 is a schematic sectional view, taken generally along the line 3—3 of FIG. 1, illustrating the relationship of a rotor to a stator and the pole pieces.

An annular array 70 of gear teeth is disposed on the stator 12 and is fixedly connected to the stator housing 34 (FIGS. 2 and 3). The annular array of gear teeth 70 circumscribes the open upper (as viewed in FIG. 3) end of the chamber 32 in which the pole pieces 20-28 are disposed. Of course, with the pole pieces 20-28 and the epoxy resin 66 disposed in the chamber 32, the open upper end of the chamber is completely blocked.

A second annular array 74 of gear teeth is disposed on the rotor 14. The annular array 74 of rotor gear teeth is axially aligned with and is designed to meshingly engage the annular array 70 of stator gear teeth. However, the annular array 74 of rotor gear teeth contains fewer teeth than the annular array 70 of stator gear teeth.

During operation of the nutating motor 10, the motor coils 62 in the pole pieces 20-22 are sequentially energized to move the rotor 14 relative to the stator 12 with a nutating motion. Thus, the ball bearings 46 (FIG. 3) support the rotor 14 for tilting movement from the initial orientation of FIG. 3. Upon energization of the motor coil 60 of one of the pole pieces 20-28, the rotor 14 is tilted downwardly toward the energized pole piece 20-28. As one side of the rotor 14 tilts downwardly toward an energized pole piece 20-28, the opposite side of the rotor tilts upwardly. Thus, if the motor coil 62 of the pole piece 28 is energized, the magnetic flux field from the core 60 will pull the left (as viewed in FIG. 3) side of the rotor 14 downwardly. Of course, the diametrically opposite or right side of the rotor 14 will move upwardly.

When the motor coil 62 of the pole piece 28 is energized to tilt the rotor 14, the annular array 74 of gear teeth on the rotor will move into meshing engagement with the annular array 70 of gear teeth on the stator 12. The area of meshing engagement between the two annular arrays 70 and 74 of gear teeth is immediately adjacent to the energized pole piece, for example, the pole piece 28.

During sequential energization of each of the pole pieces 20-28 in turn, the rotor 14 is moved relative to the stator 12 with a nutating motion. Since there are fewer gear teeth in the annular array 74 of gear teeth on the rotor 14 than in the annular array 70 of gear teeth on the stator 12, meshing engagement between the two annular arrays 70 and 74 of gear teeth will cause the rotor 14 to rotate slowly relative to the stator 12 as the rotor nutates about the central axis of the motor 10. In one specific embodiment of the invention, the annular array 74 of gear teeth on the rotor 14 included 104 gear teeth and the annular array 70 of gear teeth on the stator 12 included 105 gear teeth. In this particular embodiment of the invention, 105 cycles of nutation of the rotor 14 will result in the rotor being rotated through one revolution relative to the stator 12. Of course, any desired number of gear teeth could be provided in the annular arrays 70 and 74 of gear teeth.

During rotation of the rotor 14 relative to the stator 12, rotational force or torque is transmitted from the rotor 14 to the motor output shaft 16 through the bearings 46. Thus, rotational force is transmitted from the rotor 14 to the bearings 46. This rotational force or torque is transmitted from the bearings 46 to the bearing retainer 48 and motor output shaft 16. Therefore, the motor output shaft 16 is rotated relative to the stator 12 at the same speed as the rotor 14.

Reversing the direction of sequential energization of the pole pieces 20–28 reverses the direction of rotation of the rotor 14 relative to the stator 12 to thereby reverse the direction of rotation of the motor output shaft 16. Throughout the combined nutational and rotational movement of the rotor 14 relative to the stator 12, the annular arrays 70 and 74 of gear teeth remain in meshing engagement at a location which is adjacent to an energized pole piece. As the pole pieces are sequentially energized, the area of meshing engagement between the annular arrays 70 and 74 of gear teeth moves about the circumference of the stator 12 and rotor 14 in the direction of movement of the flux field from the sequentially energized pole pieces 20–28.

If the sequential energization of the pole pieces 20–28 is interrupted and one of the pole pieces 20, 22, 24, 26 or 28 is maintained energized, the rotor 14 is held stationary in a tilted orientation with the annular arrays 70 and 74 of gear teeth in meshing engagement. Since the annular arrays 70 and 74 of gear teeth are disposed in meshing engagement and the rotor 14 is stationary, the motor output shaft 16 cannot rotate relative to the stator 12. Thus, by energizing one of the pole pieces 20–28 and maintaining that pole piece in an energized condition, the rotor 14 and motor output shaft 16 are locked against rotation.

Upon de-energization of all of the pole pieces 20–28, the rotor 14 pivots relative to the stator 12 from a tilted orientation to the initial orientation shown in FIG. 3. When the rotor 14 is in the tilted orientation, the central axis of the rotor is skewed at an acute angle to the central axis of the stator 12 and motor output shaft 16. When the rotor 14 is in the initial orientation, the central axis of the rotor 14 is coincident with the central axes of the stator 12 and motor output shaft 16. When the rotor 14 is in the initial position, shown in FIG. 3, the rotor 14 is freely rotatable relative to the stator 12. This is because the annular arrays 70 and 74 of gear teeth are spaced apart from each other.

In accordance with one of the features of the present invention, the strength of the flux field transmitted between the stator 12 and rotor 14 is maximized by providing annular rim surface areas 80 and 84 (FIGS. 2 and 3) on the stator 12 and rotor 14. When the rotor 14 is in a tilted orientation, the rim surface areas 80 and 84 are disposed in abutting engagement at a location adjacent to an energized pole piece 20, 22, 24, 26 or 28. As the pole pieces 20–28 are sequentially energized, the area of abutting engagement of the rim surface areas 80 and 84 on the stator 12 and rotor 14 is moved by the nutating motion of the rotor 14 relative to the stator 12. The area of abutting engagement between the annular rim surface areas 80 and 84 provides a very low resistance path for transmission of magnetic flux between the stator 12 and rotor 14 to thereby increase the strength of the flux field transmitted from the stator to the rotor and the torque which can be exerted by the rotor 14 on the motor output shaft 16.

The area of abutting engagement between the rim surface areas 80 and 84 on the stator 12 and rotor 14 is disposed adjacent to the area of meshing engagement between the annular arrays 70 and 74 of gear teeth. The area of abutting engagement between the rim surfaces 80 and 84 extends radially outwardly from the annular arrays of gear teeth 70 and 74 to generally cylindrical outer side surfaces 86 and 88 on the stator 12 and rotor 14 (FIG. 3). Although there is a relatively small linear area of abutting engagement between the surface areas 80 and 84, the rim surfaces 80 and 84 are very close to each other on both sides of the area of abutting engagement. This also tends to minimize the resistance to the transmission of magnetic flux between the stator 12 and rotor 14.

In the illustrated embodiment of the invention, the rim surface areas 80 and 84 are disposed radially outwardly of the annular arrays 70 and 74 of gear teeth. However, if desired, the annular rim surface areas 80 and 84 could be disposed radially inwardly of the annular arrays 70 and 74 of gear teeth. If desired, the rim surface areas 80 and 84 could be partially disposed radially inwardly of the annular arrays 70 and 74 of gear teeth and partially disposed radially outwardly of the annular arrays of gear teeth.

In addition to maximizing the strength of the magnetic field transmitted between the stator 12 and rotor 14, the abutting engagement between the rim surface areas 80 and 84 partially supports the rotor 14 during nutational and rotational movement of the rotor relative to the stator. This tends to promote smooth rotation of the rotor 14 and to minimize wear of the annular arrays 70 and 74 of gear teeth.

Motor Current Control Circuitry

Motor current control circuitry 92 (FIG. 4) controls the energization of the motor coils 62 in the pole pieces 20–28. The motor current control circuitry 92 includes a pole piece current control circuit for each of the pole pieces 20–28. Thus, five pole piece current control circuits 94, 96, 98, 100, and 102 are provided to control the flow of current which energizes the motor coils 62 in the five pole pieces 20–28.

The flow of current through each of the motor coils 62 is controlled by upper and lower switches which are connected with opposite ends of the motor coils. Thus, upper and lower field effect transistors or switches 106 and 108 are connected with opposite ends of the motor coil 62 in the pole piece 20. Upper and lower field effect transistors or switches 110 and 112 are connected with opposite ends of the motor coil 62 in the pole piece 22. Upper and lower field effect transistors or switches 114 and 116 are connected with opposite ends of the motor coil 62 in the pole piece 24. Upper and lower field effect transistors or switches 118 and 120 are connected with opposite ends of the motor coil 62 in the pole piece 26. Upper and lower field effect transistors or switches 122 and 124 are connected with opposite ends of the motor coil 62 in the pole piece 28.

When a motor coil 62 in one of the pole pieces 20–28 is to be energized, the associated field effect transistors or switches are changed from a nonconducting condition to a conducting condition. This connects a power source 128 with the motor coil 62 to be energized. It also connects the motor coil to ground, indicated at 130.

Thus, when the motor coil 62 in the pole piece 20 is to be energized, the upper and lower switches 106 and 108 (FIG. 4) are changed from a nonconducting condition to a conducting condition. This enables current to flow from the power source 128 through the upper switch 106 to the motor coil 62 in the pole piece 20. Current can flow from the motor coil 62 through the lower switch 108 to the ground 130.

In accordance with a feature of the invention, after the upper and lower switches associated with a motor coil 62 have been conducting and for a period of time sufficient to enable current through the motor coil to build up to a desired magnitude, the upper switch is rendered nonconducting while the lower switch remains conducting. Current then flows from the motor coil 62 through the closed lower switch back to the motor coil to tend to maintain the motor coil in an energized condition. This circuitous flow of current results from the voltage which is induced in the motor coil 62 by the collapsing magnetic field of the motor coil.

Thus, when the motor coil 62 in the pole piece 20 is to be energized, the upper switch 106 and the lower switch 108 are both changed from a nonconducting condition to a conducting condition. When both the upper and lower switches 106 and 108 have been conducting for a period of time sufficient to enable current flow through the coil 62 of the pole piece 20 to build up to a desired magnitude, the upper switch 106 is changed from the conducting condition to a nonconducting condition. However, the lower switch 108 is maintained in the conducting condition.

Figure 4:
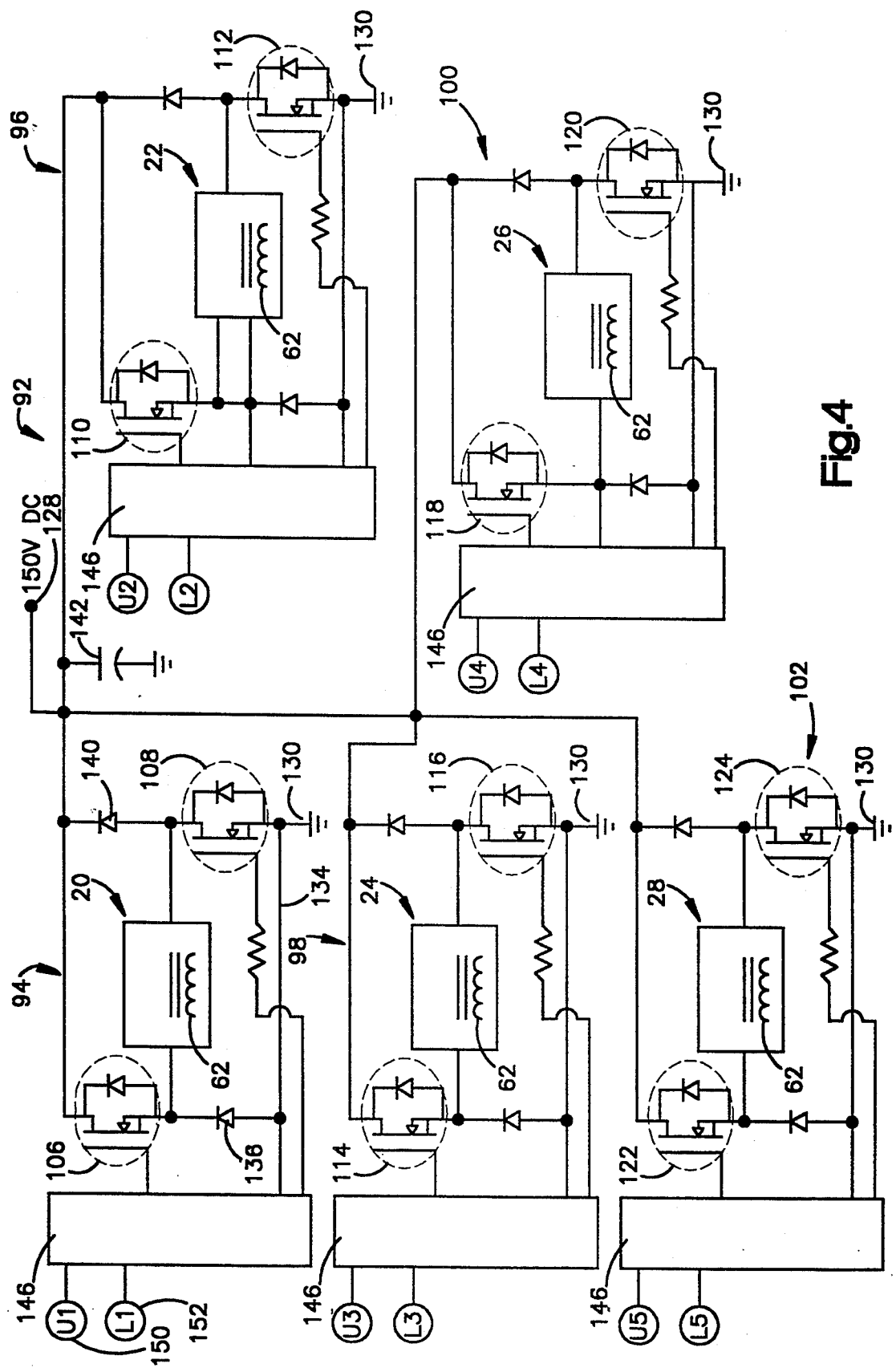
FIG. 4 is a simplified schematic illustration of motor current control circuitry for controlling current flow through motor coils of the pole pieces of FIGS. 2 and 3.
Figure 5:
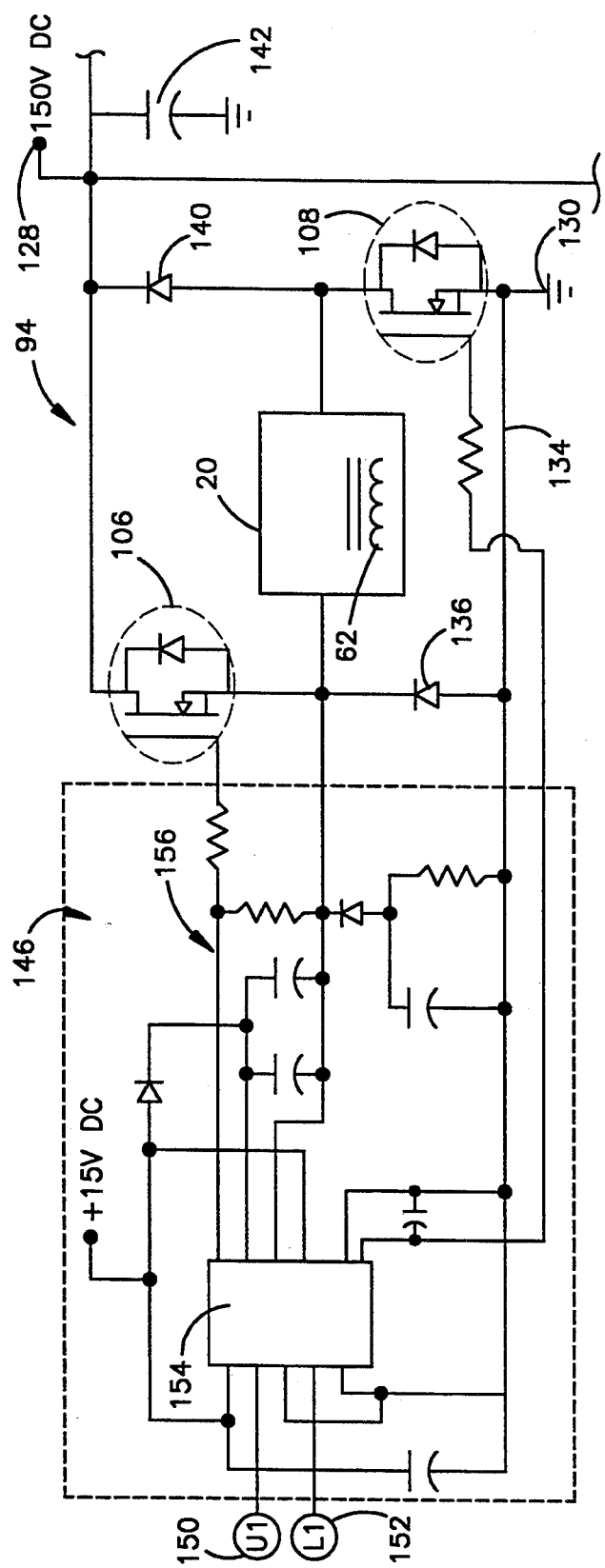
FIG. 5 is a schematic illustration of the motor current control circuitry for one of the motor coils.

As the magnetic flux field around the motor coil 62 of the pole piece 20 tends to collapse, voltage is induced in the coil. This voltage induces a flow of current through the conducting lower switch 108 to conductor 134 (FIGS. 4 and 5). The current then flows through a diode 136 back to the motor coil 62. This clockwise (as viewed in FIGS. 4 and 5) flow of current to and from the motor coil 62 in the pole piece 20 tends to maintain the motor coil energized even though the flow of current from the power source 128 has been interrupted by the upper switch 106 changing from the conducting condition to the nonconducting condition.

After the motor coil 62 in the pole piece 20 has been energized for a desired length of time, the switch 108 is rendered nonconducting. This interrupts the circuitous flow of current to and from the motor coil 62. The flow of current from the motor coil 62 then flows through a diode 140 back toward the power source 128 and toward a storage capacitor 142. The storage capacitor 142 temporarily stores the current to protect the power source 128 from exposure to excessive back current.

At the same time that the lower field effect switch 108 is rendered nonconducting in the pole piece current control circuit 94 for the pole piece 20, the upper switch 110 and lower switch 112 in the pole piece current control circuit 96 (FIG. 4) for the pole piece 22 are rendered conducting. This enables the current which is conducted from the collapsing field of the motor coil 62 in the pole piece 20 to flow through the upper switch 110 to the motor coil 62 in the next succeeding pole piece 22. Electrical current for energizing the motor coil 62 in the pole piece 22 is also supplied from the capacitor 142 and the power source 128. At this time, only the upper and lower switches 110 and 112 in the pole piece current control circuit 96 are conducting. The other upper and lower switches in the motor current control circuitry 92 are in a nonconducting condition.

After the current flow through the motor coil 62 for the pole piece 22 (FIG. 4) has been maintained for a time sufficient to increase to a desired magnitude, the upper switch 110 is rendered nonconducting. The induced current discharged from the motor coil 62 for the pole piece 22 is then conducted through the lower switch 112 back to the motor coil to tend to maintain the motor coil in an energized condition. Thereafter, the lower switch 112 is rendered nonconducting and the current from the motor coil 62 of the pole piece 22 is conducted to the capacitor 142 and the pole piece current control circuit 98 for the next succeeding pole piece 24.

As the sequential energization of the pole pieces 20–28 continues, the current from the motor coil 62 of the pole piece 24 is conducted to the pole piece current control circuit 100 to effect energization of the motor coil 62 of the pole piece 26. The motor coil 62 of the next pole piece 28 is subsequently energized by current from the motor coil 62 of the pole piece 26. This sequence of energization of the pole pieces 20–28 is repeated until the rotor 14 has provided the desired amount of rotation of the motor output shaft 16.

During operation of the motor 10, one of the motor coils 62 in the pole pieces 20–28 is always energized. Therefore, there is always a positive force holding the nutating rotor 14. In the foregoing example, the motor coil 62 for one of the pole pieces was de-energized simultaneously with initiation of energizing of the motor coil for the next succeeding pole piece. However, it is contemplated that there could be a slight overlap in the energization of the motor coils 62 for the pole pieces 20–28. Thus, initiation of energization of the motor coil 62 for one of the pole pieces would be undertaken before the lower switch for the preceding pole piece is rendered nonconducting. This would result in the rotor 14 being held, for a very short time, by magnetic flux from a pair of motor coils.

When the rotor 14 is to be rotated in a first or forward direction, the pole pieces 20, 22, 24, 26, and 28 are sequentially energized in that order. When the rotor 14 is to be rotated in the opposite or reverse direction, the pole pieces 20, 22, 24, 26, and 28 are energized in the opposite or reverse order. Thus, depending upon the order of energization of the pole pieces 20–28, the rotor 14 and motor output shaft 16 can be rotated in either a forward direction or a reverse direction.

Each of the pole piece current control circuits 94–102 includes current switch control circuitry 146 (FIG. 4). The current switch control circuitry 146 for each of the pole piece current control circuits 94–102 has the same construction and mode of operation.

The current switch control circuit 146 for the pole piece 20 has a first or upper terminal 150 (FIG. 5) through which signals for controlling the upper field effect transistor or switch 106 are received. Similarly, the current switch control circuitry 146 includes a lower terminal 152 through which signals for controlling the lower field effect transistor or switch 108 are received. The signals received on the terminals 150 and 152 are conducted to a bridge control chip or circuit 154. The output from the bridge control chip or circuit 154 is conducted through suitable noise elimination and interference circuitry 156 to the upper switch 106 and the lower switch 108. Although the bridge control chip or circuit 154 could have many different constructions, it is presently preferred to use an International Rectifier bridge control chip designated IR 2110 as the control chip 154.

The bridge control chip 154 (FIG. 5) responds to the rising edge of a pulse received at the terminal 150 to change the upper switch 106 from a nonconducting condition to a conducting condition. In addition, the bridge control chip 154 responds to the falling edge of a pulse received at the terminal 150 to change the upper switch 106 from a conducting condition to a nonconducting condition. Similarly, the bridge control chip 154 responds to the rising edge of a pulse received at the terminal 152 to change the lower switch 108 from the nonconducting condition to the conducting condition. The bridge control chip 154 responds to the falling edge of a pulse at the terminal 152 to change the transistor 108 from the conducting condition to a nonconducting condition. Although only the current switch control circuitry 146 for the pole piece current control circuit 94 is illustrated in FIG. 5, it should be understood that the current switch control circuit 146 in the other pole piece current control circuits 96–102 have the same construction as the current switch control circuit illustrated in FIG. 5.

Pole Piece Energization Control Circuitry

Figure 6:
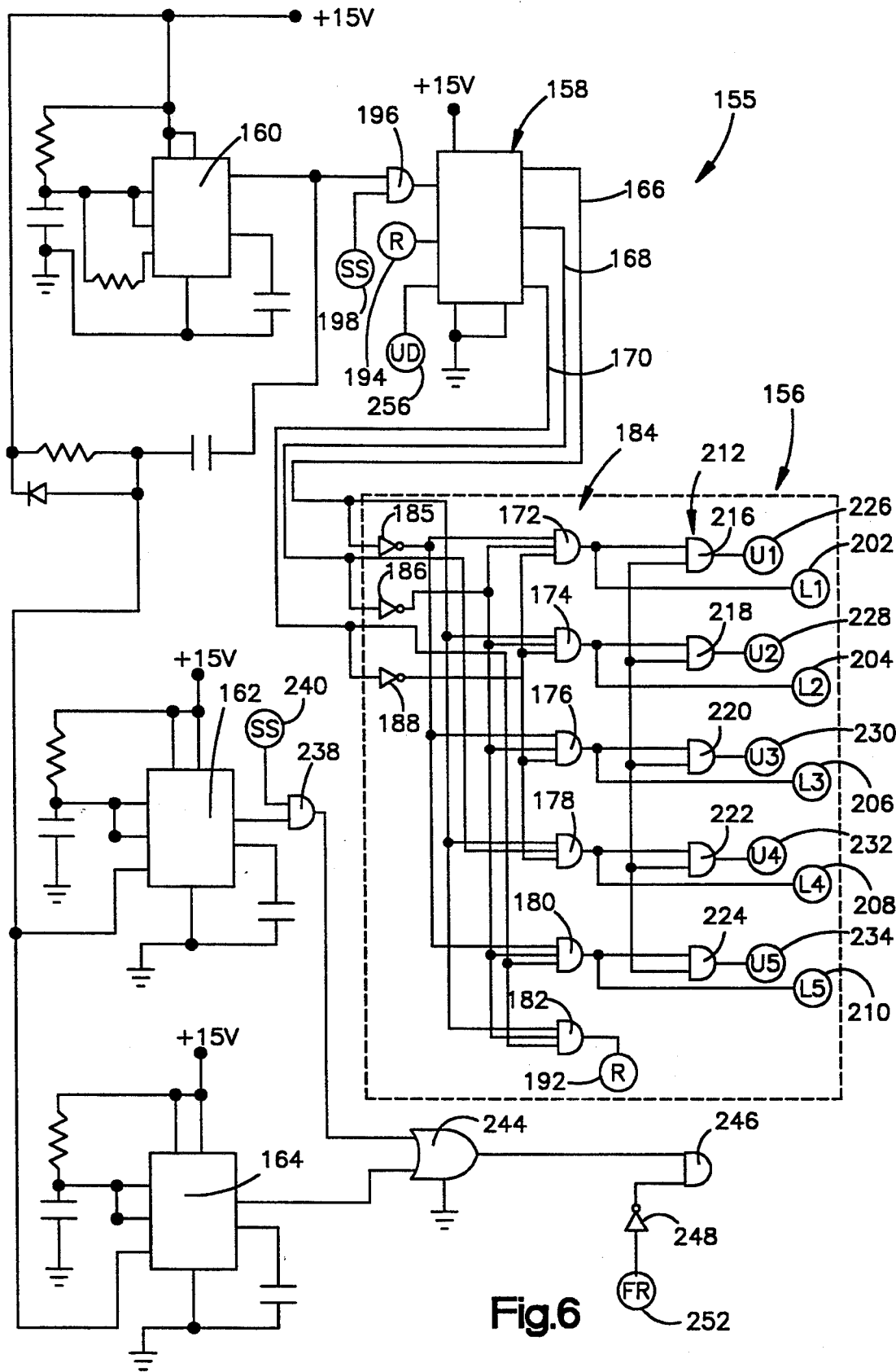
FIG. 6 is a schematic illustration of circuitry for controlling the energization of the motor coils.

Pole piece energization control circuitry 155 (FIG. 6) controls rotation of the rotor 14, holding of the rotor against rotation, and releasing of the rotor for free rotation. The pole piece energization control circuitry. 155 includes motor coil selection circuitry 156 which is connected with the pole piece current control circuits 94–102 of FIG. 4. In addition, the pole piece energization control circuitry 155 (FIG. 5) includes an up-down counter 158 which cooperates with the motor coil selection circuitry 156 to effect sequential energization of the motor coils 62 in the pole pieces 20–28.

The pole piece energization control circuitry 155 (FIG. 6) also includes a lower switch control timer or astable multivibrator 160. The lower switch control timer 160 cooperates with the counter 158 and motor coil selection circuitry 156 to control the changing of the lower switches 108, 112, 116, 120, and 124 (FIG. 4) between the conducting and nonconducting conditions. An upper switch control timer or astable multivibrator 162 (FIG. 6) cooperates with the lower switch control timer 160 and the motor coil selection circuitry 156 to control the changing of the upper switches 106, 110, 114, 118, and 122 (FIG. 4) between the conducting and nonconducting conditions.

The pole piece energization control circuitry 155 (FIG. 6) also includes a holding control timer or astable multivibrator 164. The holding control timer 164 cooperates with the lower switch control timer 160 and the motor coil selection circuitry 156 to control the continuous energization of one of the pole pieces 20–28 (FIG. 4) to retain the rotor 14 (FIG. 3) against rotation relative to the stator 12.

The up-down counter 158 (FIG. 6) sequentially counts between 000 and 101 to provide outputs over leads 166, 168, and 170. Thus, when the output from the counter 158 is 001, there will be a high output on the lead 166 and a low output on the leads 168 and 170. When the output from the counter 158 is 010, there will be a low output on the leads 166 and 170 and a high output on the lead 168. Finally, when the output from the counter 158 is 100, there will be a low output on the leads 166 and 168 and a high output on the lead 170. The output from the counter 158 effects sequential enablement of AND gates 172, 174, 176, 178, 180 and 182 in a first set 184 of AND gates. For example, when the output from the counter 158 is 000, a low output signal is conducted over each of the leads 166, 168 and 170 to the AND gates 174, 176, 178, 180 and 182. High output signals are conducted from inverters 185, 186, and 188 to AND gates 172, 174, 176, 180 and 182. This results in only the AND gate 172 being enabled. For each output of the counter 158, the AND gate which is enabled in the first set 184 of AND gates is indicated by Table I. It should be noted that for each output of the counter 158, only one of the AND gates in the first set 184 of AND gates is enabled.

TABLE I

| Output of Counter 158 | AND Gate Enabled |
|---|---|
| 000 | 172 |
| 001 | 174 |
| 010 | 176 |
| 011 | 178 |
| 100 | 180 |
| 101 | 182 |

The output from the AND gate 182 is transmitted from a reset terminal 192 to a reset terminal 194 on the counter 158. Therefore, when the counter output 158 reaches 101, a reset signal is provided from the AND gate 182 to the terminal 194 of the counter 158 to cause the counter to again count up from 000 to 101.

The counter 158 changes count in response to a rising edge of a pulse transmitted from the timer 160 through an AND gate 196. The counter 158 does not respond to the falling edge of a pulse from the timer 160. Enablement of the AND gate 196 and operation of the counter 158 is initiated by a high signal conducted from a start-stop terminal 198 to the AND gate 196. Thus, during operation of the nutating motor 10, there is a high signal at the terminal 198.

The output from the first set 184 of AND gates is conducted from terminals 202, 204, 206, 208, and 210 to the lower switch control terminals of the pole piece current control circuits 94, 96, 98, 100, and 102. Thus, the terminal 202 is connected to the terminal 152 of the pole piece current control circuit 94 (FIGS. 4 and 5).

When the count in the counter 158 changes from 101 to 000, the AND gate 172 is enabled and a pulse is transmitted from the terminal 202 in the motor coil selection circuitry 156 to the terminal 152 in the current switch control circuitry 146 (FIGS. 4 and 5). The rising edge of the pulse causes the current switch control circuitry 146 to change the lower switch 108 from the nonconducting condition to the conducting condition. When the count in the counter 158 changes from 000 to 001, the AND gate 172 is disabled and the falling edge of the pulse causes the current switch control circuitry 146 to change the lower switch 108 from the conducting condition to the nonconducting condition.

The output from the first set of AND gates 184 and the output from the upper switch control timer 162 controls the output of a second set 212 of AND gates. The second set 212 of AND gates includes AND gates 216, 218, 220, 222, and 224. The AND gates 216–224 are connected with terminals 226, 228, 230, 232, and 234 in the motor coil selection circuitry 156. The terminals 226–234 are connected with upper switch control terminals in the pole piece current control circuits 94–102 (FIG. 4). Thus, the terminal 226 (FIG. 6) is connected to the terminal 150 (FIGS. 4 and 5) in the current switch control circuitry 146 for the pole piece current control circuit 94.

The output of the upper switch control timer 162 (FIG. 6) is conducted through an AND gate 238. When operation of the nutating motor 10 is to be started, a high signal is transmitted to a start/stop terminal 240 connected with the AND gate 238. This high signal is maintained on the start/stop terminal 240 until operation of the motor 10 is to be interrupted.

Operation of the upper switch control timer 162 is coordinated with the operation of the lower switch control timer 160 so that a change in the output of the lower switch control timer 160 initiates a simultaneous change in the output from the upper switch control timer 162. The output from the upper switch control timer 162 is conducted through an OR gate 244 and an AND gate 246 to the second set 212 of AND gates. The AND gate 246 is enabled by a signal conducted from an inverter 248 whenever a high output free rotation signal is not present at a terminal 252.

Assuming that the output from the counter 158 was 000 so that the AND gate 216 is partially enabled by the output from the AND gate 172, a pulse is transmitted from the counter 162 through the AND gate 216 to the terminal 226. The output from the terminal 226 is conducted to the corresponding terminal 150 in the pole piece current control circuit 94 (FIGS. 4 and 5). The rising edge of the pulse conducted from the terminal 226 to the terminal 150 causes the current switch control circuitry 146 to change the upper switch 106 from a nonconducting condition to the conducting condition. After the output from the timer 162 (FIG. 6) has been high for a period of time corresponding to the setting of the timer, the output from the timer goes low. This results in the AND gate 216 being disabled. The resulting falling edge of pulse transmitted from the terminal 226 to the terminal 150 causes the current switch control circuitry 146 to change the upper switch 106 from the conducting condition to the nonconducting condition.

In the illustrated embodiment of the invention, the timers 160 and 162 are set for the same period of time. This period of time corresponds to the length of time for which it is desired to have the upper switches 106, 110, 114, 118, and 122 in the motor current control circuitry 94 conducting. The output from the first set 184 of AND gates is not changed until the output from the counter 158 is changed. The output from the counter 158 does not change until the output from the lower switch control timer 160 rises, that is, goes from low to high. Therefore, the output from the terminal 202 to the terminal 152 remains high while the output from the terminal 226 changes from high to low. This results in the lower switch 108 being maintained in a conducting condition while the upper switch 106 is changed from the conducting condition to the nonconducting condition.

A signal conducted to the counter 158 from a terminal 256 (FIG. 6) determines whether the counter 158 counts upward or downward. When the counter 158 is counting upward, the sequence of energization of the motor coils 62 is such as to cause the rotor 14 to rotate in a forward direction. When the input to the terminal 256 is low, the counter counts in a reverse direction and sequence of energization of the motor coils 62 causes the rotor 14 to rotate in the reverse direction.

In accordance with another feature of the invention, the rotor 14 can be held against rotation relative to the stator 12 upon interruption of sequential energization of the motor coils 62 in the pole pieces 20–28. This is accomplished by energizing the motor coil 62 in one of the pole pieces 20–28 to hold the rotor 14 in a tilted orientation with the array 74 of gear teeth on the rotor in meshing engagement with the array 70 of gear teeth on the stator 12. Since the rotor 14 (FIG. 3) is fixedly connected to the motor output shaft 16, the meshing engagement between the arrays 70 and 74 of gear teeth is effective to hold both the rotor 14 and the motor output shaft 16 against rotation relative to the stator. At this time, the annular rim surface areas 80 and 84 on the stator 12 and rotor 14 are disposed in abutting engagement to tend to maximize the strength of the flux field holding the arrays 70 and 74 of gear teeth in meshing engagement.

When the rotor 14 is to be maintained in the tilted orientation to hold the motor output shaft 16 against rotation, the lower switch 108, 112, 116, 120, or 124 (FIG. 4) in one of the pole piece current control circuits 94, 96, 98, 100 or 102 is maintained in a conducting condition. The lower switches in the other pole piece current control circuits are maintained in a nonconducting condition. The upper switch 106, 110, 114, 118, or 122 in the pole piece current control circuit 94, 96, 98, 100, or 102 in which the lower switch is maintained in a conducting condition, is periodically rendered conducting for a relatively short time and then rendered nonconducting for a relatively long time. This results in the motor coil 62 in the pole piece which is energized to hold the rotor in the tilted orientation being periodically energized by a pulse from the power source 128 and then maintained in an energized condition by a flow of current from the motor coil 62 through the conducting lower switch back to the motor coil.

For example, if the pole piece 20 is selected to maintain the rotor 14 in a tilted orientation, the motor coil selection circuitry 155 (FIG. 6) maintains the lower switch or field effect transistor 108 (FIGS. 4 and 5) in the conducting condition by continuously providing a high input to the terminal 152. The input to the terminal 150 is a pulse. This pulse goes high for a relatively short period of time and then remains low for a relatively long period of time. The rising edge of a pulse to the terminal 150 causes the current switch control circuitry 146 in the pole piece current control circuit 94 to change the switch 106 from the nonconducting condition to the conducting condition.

When the switch 106 (FIGS. 4 and 5) is in the conducting condition, current flows from the power source 128 through the switch 106, the motor coil 62 in the pole piece 20, and the switch 108 to ground 130. Energization of the motor coil 62 in the pole piece 20 results in the rotor 14 being strongly pulled toward the tilted orientation.

After a short time, the input to the terminal 150 changes from high to low. This results in the switch 106 being rendered nonconducting. Current then flows in a circuitous path from the motor coil 62 in the pole piece 20 through the conducting switch 108 back to the motor coil.

When the rotor 14 is to be maintained stationary in the tilted orientation to hold the motor output shaft 16 against rotation, a high signal on the start/stop terminals 198 and 240 (FIG. 6) is changed to a low signal. This disables the AND gates 196 and 238. Disabling the AND gate 196 results in the output from the counter 158 being maintained constant. Therefore, one of the AND gates in the first set 184 of AND gates is maintained in an enabled condition while the other AND gates in the first set 184 of AND gates are disabled. The high output from the enabled AND gate in the first set 184 of AND gates is conducted to one of the terminals 202–210 to maintain a lower switch 108, 112, 116, 120, or 124 in the motor current control circuitry 92 in a conducting condition.

When the signal at the start/stop terminal 240 goes low, the AND gate 238 is disabled. Thereafter, the output from the timer 162 does not effect the second set 212 of AND gates.

The output from the holding control timer 164 (FIG. 6) is utilized to periodically enable one of the AND gates in the second set 212 of AND gates for a relatively short period of time. The output from the timer 164 is conducted through the OR gate 244 and the AND gate 246 to the second set 212 of AND gates. The AND gate in the second set 212 of AND gates which is connected with the AND gate which is enabled in the first set 184 of AND gates is periodically enabled by the output from the timer 164. The output from the timer 164 is high for a relatively short period of time and then is maintained low for a relatively long period of time. This results in the output from one of the AND gates in the second set 212 of AND gates being conducted from one of the terminals 226–234 to the corresponding terminal in the motor current control circuitry (FIG. 4) to render one of the upper switches 106, 110, 114, 118 or 122 conducting for a relatively short period of time and then nonconducting for a relatively long period of time.

For example, if the signals at the start/stop terminals 198 and 240 (FIG. 6) went from high to low when the output from the counter 158 was 000, the AND gate 172 in the first set 184 of AND gates would be enabled. The constant enablement of the AND gate 172 results in a constant high signal being conducted from the terminal 202 to the terminal 152 in the pole piece current control circuit 94 (FIG. 5) to maintain the lower switch 108 in a conducting condition in the manner previously explained.

When the output from the counter 164 goes from low to high, the AND gate 216 in the second set 212 of AND gates is enabled. This results in a pulse being conducted from the terminal 226 (FIG. 6) to the terminal 150 (FIG. 5). The rising edge of the pulse from the terminal 226 causes the current switch control circuitry 146 to change the upper switch 106 from the nonconducting condition to the conducting condition. This results in current being conducted from the power source 128 through the upper switch 106, motor coil 62 in the pole piece 20 and lower switch 108 to ground 130. This results in the motor coil 62 being energized.

After the output from the holding control timer 164 (FIG. 6) has been high for a relatively short period of time, the output from the holding control timer goes low. This results in the AND gate 216 being disabled. The resulting falling edge of the pulse conducted from the terminal 226 (FIG. 6) to the terminal 150 (FIG. 5) causes the pole piece current control circuit 146 to change the upper switch 106 from the conducting condition to the nonconducting condition. However, the lower switch 108 remains conducting.

Current from the motor coil 62 in the pole piece 20 flows from the motor coil through the conducting lower switch 108, lead 134 and diode 136 (FIG. 5) back to the motor coil 62 to maintain the motor coil energized. The circuitous flow of current from and back to the motor coil 62 in the pole piece 20 maintains the motor coil energized during the relatively long period of time in which the output from the holding control timer 64 is low. Although the strength of the magnetic flux field from the pole piece 20 decreases somewhat while the motor coil 62 is energized by a circuitous flow of current to and from the motor coil through the conducting lower switch 108, the strength of the magnetic field remains more than sufficient to hold the rotor 14 in the tilted orientation with the arrays 70 and 74 of gear teeth in meshing engagement. This is due, in part at least, to the low resistance to conduction of flux between the stator 12 and rotor 14 provided by abutting engagement of the rim surface areas 80 and 84 at a location radially outwardly from the pole piece 20.

The holding current timer 164 (FIG. 6) is connected with the lower switch control timer 160. Therefore, the input from the lower switch control timer 160 is effective to change the output of the holding control timer 164 from low to high simultaneously with a change in the output of the lower switch control timer 160 from low to high. However, the period for which the output from the holding control timer 164 remains high is substantially shorter than the period of time for which the output from the lower switch control timer 160 remains high.

In one specific embodiment of the invention, the output from the lower switch control timer 160 went from low to high and then back to low after one millisecond. The output from the timer 160 then went from low back to high after one millisecond. In this specific embodiment of the invention, the output from the holding control timer 164 went from high to low after being high for 0.1 milliseconds. The output from the holding control timer 164 then remained low for 1.9 milliseconds, that is, until the output from the lower switch control timer 160 again goes high. It should be understood that the foregoing specific time periods for the lower switch control timer 160 and holding control timer 164 have been set forth herein for purposes of clarity of description and it is contemplated that different time periods may be utilized for different embodiments of the invention.

Figure 7:
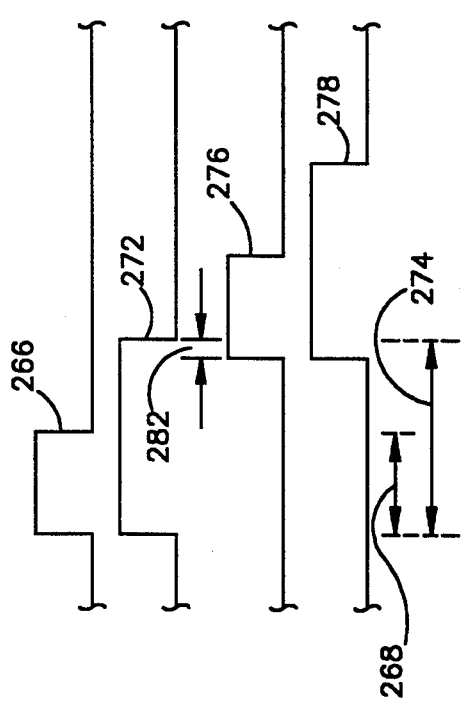
FIG. 7 (on sheet four of the drawings) is a schematic illustration depicting the sequence in which motor current control switches associated with two of the motor coils are rendered conducting and nonconducting.

During sequential energization of the motor coils 62 in the pole pieces 20–28, the upper field effect transistor or switch, for example the switch 106 (FIG. 5), is maintained in a conducting condition by a pulse, indicated at 266 in FIG. 7, at the upper input terminal, that is the terminal 150 for the pole piece current control circuit 94. This results in the upper switch 106 being maintained in a conducting condition for a period of time indicated at 268 in FIG. 7. In the foregoing specific embodiment of the invention, the time period indicated at 268 would be one millisecond.

The lower switch, that is, the switch 108, is maintained in the conducting condition by a pulse indicated at 272 in FIG. 7. The pulse 272 maintains the lower switch 108 in a conducting condition for a period of time indicated at 274 in FIG. 7. In the foregoing specific embodiment of the invention, the period of time indicated at 274 would be two milliseconds.

After the pulse 272 (FIG. 7) has ended, the motor coil 62 in the pole piece is de-energized and the next succeeding pole piece is energized. Thus, in the foregoing example, the motor coil 62 in the pole piece 20 is de-energized at the end of the pulse 272. During continued forward rotation of the rotor 14, the upper and lower switches 110 and 112 are rendered conducting by pulses 276 and 278.

In the foregoing description, it was assumed that the next succeeding pole piece becomes energized simultaneously with de-energization of the preceding pole piece. However, it is contemplated that it may be desirable to have a slight overlap between the energization of one pole piece and the energization of the next succeeding pole piece. This overlap is indicated at 282 in FIG. 7. Thus, immediately before the pole piece 20 is de-energized, the pole piece 22 is energized.

The period of overlap between the energization of the two pole pieces is very short, less than 0.1 milliseconds. The period 282 for which the energization of the pole pieces 20 and 22 overlap can be set by adjustment of the current switch control circuitry 146 connected with the upper and lower switches. Although it is believed that a very slight overlap in the energization of the pole pieces may be desirable in order to promote smooth operation of the nutating motor 14, it is contemplated that it may be preferred to operate the nutating motor without any overlap between the energization of the pole pieces, that is by energizing the next succeeding pole piece simultaneously with de-energization of the preceding pole piece.

Drive Mechanism

It is contemplated that the nutating motor 10 will be utilized in many different environments to drive many different mechanisms. However, it is believed that the nutating motor 10 may be advantageously utilized in a cryogenic environment to operate a valve 288 (FIG. 8) to modulate a flow of fluid through an opening 290.

The motor output shaft 16 is connected with the valve 288 (FIG. 8) by a drive assembly 294. In this specific embodiment of the invention, the drive assembly 294 includes a recirculating ball nut 296 which is connected with an externally threaded screw shaft 298. The ball nut 296 is fixedly connected to the motor output shaft 16 and rotates with the motor output shaft.

Rotation of the ball nut 296 moves the screw shaft 298 axially to change the position of the valve 288 relative to the opening 290. A linear variable differential transformer 302 is connected with the screw shaft 298 in the manner indicated schematically at 304 in FIG. 8. The output from the linear variable differential transformer 302 indicates the position of the valve 288 relative to the opening 290. A biasing spring 308 urges the valve 288 toward an initial or closed condition in which the valve blocks flow through the opening 290.

When the valve 280 is to be moved from the closed condition toward an open condition, illustrated in FIG. 8, the nutating motor 10 is operated in a forward direction to rotate the rotor 14 and output shaft 16 relative to the stator 12. Rotation of the motor output shaft 16 rotates the ball nut 296 to move the screw shaft 298 axially downwardly (as viewed in FIG. 8). Movement of the screw shaft 298 moves the valve 288 from the initial or closed condition to the open condition illustrated in FIG. 8. When the valve 288 is to be moved back toward the closed condition to decrease the rate of the flow of fluid through the opening 290, the motor 10 is operated in the reverse direction to reverse the direction of rotation of the rotor 14 and motor output shaft 16.

When the valve 288 has been operated to obtain a desired rate of fluid flow through the opening 290, the rotation of the rotor 14 is stopped and the rotor is held in the tilted orientation by energization of one of the pole pieces 20–28 in the motor 10 in the manner previously explained. This results in meshing engagement between the annular arrays 70 and 74 (FIG. 3) of gear teeth holding the rotor 14 and motor output shaft 16 against rotation relative to the stator 12. Of course, holding the motor output shaft 16 against rotation relative to the stator 12 holds the valve 288 against movement relative to the opening 290 to maintain the desired rate of flow of fluid through the opening.

When the valve 288 is to be closed, a high input signal is provided at the terminal 252 to disable the AND gate 246. Low input signals are provided at the terminals 198 and 240 to disable the AND gates 196 and 238. The pole pieces 20–28 are all de-energized and the rotor 14 moves from the tilted orientation to the initial or unactuated orientation of FIG. 3.

At this time, the annular arrays 70 and 74 of gear teeth are separated from each other so that the rotor 14 and motor output shaft 16 are freely rotatable relative to the stator 12. The force applied by the biasing spring 308 against the valve 288 is effective to force the screw shaft 298 to move upwardly (as viewed in FIG. 8). This results in the ball nut 296 being driven to rotate the motor output shaft 16 and rotor 14 in the reverse direction relative to the stator 12. When the valve 288 has moved to the closed condition, axial movement of the screw shaft 298 is stopped and rotation of the motor output shaft 16 and rotor 14 are stopped.

In the illustrated embodiment of the invention, the valve 288 is a poppet-type valve. It is contemplated that the valve could have a different construction, for example, the valve could be a ball-type valve. One specific type of drive assembly 294 has been illustrated in FIG. 8. However, it is contemplated that other known drive assemblies could be utilized. It should be understood that the nutating motor assembly 10 can be used with many different types of drive assemblies to actuate many different types of devices.

In the embodiment of the invention illustrated in FIG. 8, the biasing spring 308 is connected in series with the valve 288 and screw shaft 298. Therefore, the screw shaft 298 is moved back toward its initial position by a force transmitted through the valve to the screw shaft. However, it is contemplated that the biasing spring 308 could be connected in parallel with the screw shaft 298. If this was done, the force of the biasing spring 308 would be applied directly to the screw shaft 298 rather than through the valve.

Second Embodiment

In the embodiment of the nutating motor 10 illustrated in FIGS. 1–3, the rotor 14 is moved between the tilted orientation and the initial orientation of FIG. 3 without the benefit of force provided by a biasing spring. It is believed that this is advantageous since the rotor 14 can then be readily moved from the initial orientation of FIG. 3 to the tilted orientation under the influence of minimal force from the flux field of an energized pole piece. However, it is contemplated that it may be desirable to provide a positive force biasing the rotor 14 to the initial or untilted position of FIG. 3. In the embodiment of the invention illustrated in FIG. 9, a biasing force is provided to urge the rotor toward the initial orientation. Since the embodiment of the invention illustrated in FIG. 9 is generally similar to the embodiment of the invention illustrated in FIGS. 1–3, similar numerals will be utilized to designate similar components, the suffix letter "a" being added to avoid confusion.

In the embodiment of the invention illustrated in FIG. 9, a helical coil biasing spring 320 applies a biasing force against the bearing retainer 44a. The biasing force applied by the spring 320 against the bearing retainer 44a is transmitted to the rotor 14a to urge the rotor to the initial or untilted orientation shown in FIG. 3. The force of the biasing spring 320 is sufficient to move the rotor 14a to the initial orientation against the effect of any residual magnetism which may remain in the pole pieces 20-28.

Conclusion

In view of the foregoing description, it is apparent that the present invention relates to a motor apparatus 10 which includes a stator 12 having an annular array 70 of gear teeth. A rotor 14 is movable relative to the stator 12 and has a second annular array 74 of gear teeth. A plurality of motor coils 62 in pole pieces 20–28 are sequentially energizeable to cause the rotor 14 to tilt and then move relative to the stator 12 with the annular arrays 70 and 74 of gear teeth in meshing engagement. During movement of the rotor 14 relative to the stator 12, the meshing annular arrays 70 and 74 of gear teeth cooperate to effect rotation of the rotor relative to the stator.

Control circuitry (FIGS. 4–6) for effecting sequential energization of the motor coils 62 in the pole pieces 20–28 includes a pair of switches 106-124 for each of the coils. The switches connected with opposite ends of a coil 62 are rendered conducting to effect energization of the coil. For example, the switches 106 and 108 are rendered conducting to energize the coil 62 in the pole piece 20. Thereafter, one of the switches is rendered nonconducting. Current flows from the coil through the conducting switch and back to the coil to maintain the coil in an energized condition. Thus, in the example, the switch 106 is rendered nonconducting and current flows through the conducting switch 108 back to the coil 62.

Operation of the motor 10 may be interrupted and the motor output shaft 16 held against rotation by maintaining one of the motor coils 62 energized. One of the switches 108, 112, 116, 120 or 124 is maintained in a conducting condition. One of the switches 106, 110, 114, 118 or 122 is periodically operated to a conducting condition for a relatively short time and then operated to a nonconducting condition for a relatively long time. During the relatively long time in which the one switch is in a nonconducting condition, current is conducted from the motor coil 62 through the conducting switch back to the motor coil to maintain the motor coil in an energized condition.

During movement of the rotor 14 relative to the stator 12, a magnetic flux field for the motor 10 should be as strong as possible. In order to provide for minimal resistance to the flow of magnetic flux, the stator 12 and rotor 14 have surface areas 80 and 84 which are maintained in abutting engagement during movement of the rotor relative to the stator. In addition, the surface areas 80 and 84 are maintained in abutting engagement when the rotor 14 is held stationary with the annular arrays 70 and 74 of gear teeth in meshing engagement.

The operating characteristics of the motor 10 are maximized by providing only five motor coils 62 in five pole pieces 20–28. The provision of five motor coils 62 maximizes the pole surface area of the core 60 around which the motor coil is disposed. If a greater number of motor coils 62 is provided, the total pole surface area is reduced due to the spacing between the motor coils. If the number of motor coils 62 is less than five, smooth operation of the motor is impaired.

In one embodiment of the invention, the motor 10 is connected with an apparatus having a biasing spring 308 which urges the apparatus towards an initial condition. In this embodiment of the invention, all of the motor coils 62 are de-energized to enable the rotor 14 to freely rotate relative to the stator 12. The biasing spring 308 then causes the rotor 14 to move back toward an initial position as the apparatus moves toward its initial condition.

Having described the invention, the following is claimed:

1. A motor apparatus comprising a stator having a first annular array of gear teeth, a rotor having a second annular array of gear teeth, a plurality of motor coils connected with said stator and sequentially energizeable to cause said rotor to move relative to said stator with said first and second annular arrays of gear teeth in meshing engagement, said first and second annular arrays of gear teeth cooperating to effect rotation of said rotor relative to said stator during movement of said rotor under the influence of said plurality of motor coils, and control means for effecting sequential energization of said plurality of motor coils, said control means including a plurality of first switch means each of which is connected with a first end portion of one of said motor coils of said plurality of motor coils, a plurality of second switch means each of which is connected with a second end portion of one of said motor coils of said plurality of motor coils, each of said first and second switch means being operable between a conducting condition and a nonconducting condition, means for effecting operation of a first one of said switch means of said first plurality of switch means and a first one of said switch means of said second plurality of switch means from the nonconducting condition to the conducting condition to effect energization of a first one of said motor coils under the influence of electrical current conducted through said first one of said first plurality of switch means and said first one of said second plurality of switch means, means for effecting operation of said first one of said first plurality of switch means from the conducting condition to the nonconducting condition while maintaining said first one of said second plurality of switch means in the conducting condition to establish a flow of electrical current from said first one of said plurality of motor coils back to said first one of said plurality of motor coils through said first one of said second plurality of switch means to thereby tend to maintain said first one of said plurality of motor coils energized with said first one of said first plurality of switch means in the nonconducting condition, and means for effecting operation of said first one of said second plurality of switch means from the conducting condition to the nonconducting condition after operation of said first one of said first plurality of switch means from the conducting condition to the nonconducting condition to interrupt the flow of current back to said first one of said plurality of motor coils.

2. A motor apparatus as set forth in claim 1 wherein said control means includes means for maintaining all of the switch means in said first plurality of switch means other than said first one of said first plurality of switch means in a nonconducting condition upon operation of said first one of said first plurality of switch means from the nonconducting condition to the conducting condition.

3. A motor apparatus as set forth in claim 1 wherein said control means includes means for effecting operation of a second one of said switch means of said first plurality of switch means and a second one of said switch means of said second plurality of switch means from the nonconducting condition to the conducting condition while said first one of said switch means of said first plurality of switch means is in a nonconducting condition and said first one of said switch means of said second plurality of switch means is in a conducting condition.

4. A motor apparatus as set forth in claim 1 wherein said plurality of motor coils connected with said stator consists of only five coils.

5. A motor apparatus as set forth in claim 1 wherein said means for effecting operation of a first one of said switch means of said first plurality of switch means and a first one of said switch means of said second plurality of switch means from the nonconducting condition to the conducting condition, said means for effecting operation of said first one of said first plurality of switch means from the conducting condition to the nonconducting condition while maintaining said first one of said second plurality of switch means in the conducting condition, and said means for effecting operation of said first one of said second plurality of switch means from the conducting condition to the nonconducting condition after operation of said first one of said first plurality of switch means from the conducting condition to the nonconducting condition include first means for providing an output which changes when a first predetermined time period has elapsed, second means for providing an output which changes when a second predetermined time period which is longer than the first predetermined time period has elapsed, means connected with said first and second means for effecting a simultaneous initiation of said first and second predetermined time periods, and circuit means for effecting simultaneous operation of said first one of said switch means of said first plurality of switch means and said first one of said switch means of said second plurality of switch means from the nonconducting condition to the conducting condition in response to said first and second means simultaneously initiating said first and second predetermined time periods, said circuit means being operable to effect operation of said first one of said switch means of said first plurality of switch means from the conducting condition to the nonconducting condition in response to the output of said first means changing after said first predetermined time period has elapsed, said circuit means being operable to effect operation of said first one of said switch means of said second plurality of switch means from the conducting condition to the nonconducting condition in response to the output of said second means changing after said second predetermined time period has elapsed.

6. A motor apparatus as set forth in claim 1 wherein said means for effecting operation of said first one of said first plurality of switch means from the conducting condition to the nonconducting condition effects operation of said first one of said first plurality of switch means to the nonconducting condition after said first one of said first plurality of switch means has been in the conducting condition for a first predetermined period of time during operation of said control means to effect sequential energization of said plurality of motor coils, said control means including holding means for interrupting sequential energization of said plurality of motor coils and holding said rotor against movement relative to said stator with said first and second annular arrays of gear teeth in meshing engagement, said holding means including means for maintaining said first one of said second plurality of switch means in the conducting condition and for periodically maintaining said first one of said first plurality of switch means in the conducting condition for a period of the which is substantially less than said first predetermined period of time.

7. A motor apparatus as set forth in claim 1 wherein said control means further includes means for effecting rotation of said rotor in a first direction relative to said stator by effecting sequential energization of said plurality of motor coils in a first sequence and for effecting rotation of said rotor in a second direction relative to said stator by effecting sequential energization of said plurality of motor coils in a second sequence.

8. A motor apparatus as set forth in claim 1 wherein said stator includes a first annular body of metal disposed in a coaxial relationship with said first annular array of gear teeth, said rotor including a second annular body of metal disposed in a coaxial relationship with said second annular array of gear teeth, said first and second annular bodies of metal being disposed in abutting engagement during relative movement between said rotor and stator with said first and second annular arrays of teeth in meshing engagement.

9. A motor apparatus as set forth in claim 1 further including biasing means connected with said rotor for urging said rotor toward an initial position relative to said stator, said rotor being rotatable relative to said stator against the influence of said biasing means during sequential energization of said plurality of motor coils, said control means including means for de-energizing said plurality of motor coils to release said rotor for movement relative to said stator by said biasing means, said biasing means being operable to rotate said rotor back toward the initial position upon de-energization of said plurality of motor coils.

10. A motor apparatus as set forth in claim 1 further including means for conducting electrical energy from said first one of said plurality of motor coils to a second one of said plurality of motor coils upon operation of said first one of said second plurality of switch means from the conducting condition to the nonconducting condition to at least partially effect energization of said second one of said motor coils under the influence of energy conducted from said first one of said motor coils.

11. A motor apparatus as set forth in claim 10 further including capacitor means connected with said first one of said plurality of motor coils and said second one of said plurality of motor coils for temporarily storing electrical energy.

12. A motor apparatus comprising a stator having a first annular array of gear teeth, a rotor having a second annular array of gear teeth, a plurality of motor coils connected with said stator and sequentially energizeable to cause said rotor to move relative to said stator with said first and second annular arrays of gear teeth in meshing engagement, said first and second annular arrays of gear teeth cooperating to effect rotation of said rotor relative to said stator during movement of said rotor under the influence of said plurality of motor coils, control means for effecting sequential energization of said plurality of motor coils, said control means including a plurality of first switch means each of which is connected with a first end portion of one of said motor coils of said plurality of motor coils, a plurality of second switch means each of which is connected with a second end portion of one of said motor coils of said plurality of motor coils, each of said first and second switch means being operable between a conducting condition and a nonconducting condition, and circuit means for effecting sequential operation of each one of said switch means of said first plurality of switch means and each one of said switch means of said second plurality of switch means from the nonconducting condition to the conducting condition to effect sequential energization of each of said motor coils under the influence of electrical current conducted through one of said switch means of first plurality of switch means and one of said switch means said second plurality of switch means, and for effecting sequential operation of each one of said switch means of said first plurality of switch means and each one of said switch means of said second plurality of switch means from the conducting condition to the nonconducting condition to effect sequential de-energization of each of said motor coils, said circuit means including means for sequentially maintaining each one of said switch means of said first plurality of switch means in the conducting condition for a first period of time upon sequential operation of each one of said switch means to the conducting condition, and holding means for interrupting sequential energization of said plurality of motor coils and holding said rotor against movement relative to said stator with said first and second annular arrays of gear teeth in meshing engagement, said holding means including means for periodically maintaining a first one of said switch means of said first plurality of switch means in the conducting condition for a second period of time which is substantially less than said first period of time.

13. A motor apparatus as set forth in claim 12 wherein said holding means includes means for operating a first one of said second plurality of switch means to the conducting condition to effect energization of a first one of said motor coils under the influence of electrical current conducted through said first one of said first plurality of switch means and said first one of said second plurality of switch means when said first one of said first plurality of switch means is in the conducting condition.

14. A motor apparatus as set forth in claim 12 wherein said holding means includes means for maintaining a first one of said second plurality of switch means in the conducting condition to effect energization of a first one of said motor coils under the influence of electrical current conducted through said first one of said first plurality of switch means and said first one of said second plurality of switch means when said first one of said first plurality of switch means is in the conducting condition and to enable electrical current to flow from a first one of said plurality of motor coils back to said first one of said plurality of motor coils through said first one of said second plurality of switch means to thereby tend to maintain said first one of said plurality of motor coils energized with said first one of said first plurality of switch means in the nonconducting condition.

15. A motor apparatus as set forth in claim 12 wherein said holding means includes means for maintaining one of said motor coils in an energized condition and motor coils other than said one motor coil in a de-energized condition to hold said second annular array of gear teeth on said rotor in meshing engagement with said first annular array of gear teeth on said stator.

16. A motor apparatus as set forth in claim 12 wherein said plurality of motor coils connected with said stator consists of only five coils.

17. A motor apparatus as set forth in claim 12 wherein said stator includes a first annular body of metal disposed in a coaxial relationship with said first annular array of gear teeth, said rotor including a second annular body of metal disposed in a coaxial relationship with said second annular array of gear teeth, said first and second annular bodies of metal being disposed in abutting engagement during relative movement between said rotor and stator with said first and second annular arrays of teeth in meshing engagement and during holding of rotor against movement relative to said stator by said holding means.

18. A motor apparatus as set forth in claim 12 further including biasing means connected with said rotor for urging said rotor toward an initial position relative to said stator, said rotor being rotatable relative to said stator against the influence of said biasing means during sequential energization of said plurality of motor coils, said holding means being effective to hold said rotor against rotation relative to said stator under the influence of said biasing means upon interruption of sequential energization of said plurality of motor coils, said control means including means for rendering said holding means ineffective and de-energizing said plurality of motor coils to release said rotor for movement relative to said stator by said biasing means, said biasing means being operable to rotate said rotor back toward the initial position upon de-energization of said plurality of motor coils.

19. A motor apparatus as set forth in claim 12 further including means for conducting electrical energy from a first one of said plurality of motor coils to a second one of said plurality of motor coils upon operation of said first one of said second plurality of switch means from the conducting condition to the nonconducting condition to at least partially effect energization of said second one of said motor coils under the influence of energy conducted from said first one of said motor coils.

20. A motor apparatus comprising a stator, said stator including a metal housing having surface mans for at least partially defining a circular chamber having an open end portion and a first annular array of gear teeth which circumscribe the circular open end portion of said chamber, said housing having an annular side surface area which is coaxial with said first annular array of gear teeth, a metal rotor having a second annular array of gear teeth, said rotor having an annular side surface area which is coaxial with said second annular array of gear teeth, a plurality of motor coils disposed in said circular chamber in said hosing and sequentially energizeable to cause said rotor to move relative to said stator with said first and second annular arrays of gear teeth in meshing engagement and with said first and second annular arrays of gear teeth cooperating to effect rotation of said rotor relative to said stator during movement of said rotor under the influence of said plurality of motor coils, and control means for effecting sequential energization of said plurality of motor coils to move a magnetic flux field relative to said stator, said magnetic flux field being at least partially conducted between said stator and said rotor through an area of abutting engagement between said annular side surface area on said housing and said annular side surface area on said rotor, said control means including a plurality of first switch means each of which is connected with a first end portion of one of said motor coils of said plurality of motor coils, a plurality of second switch means each of which is connected with a second end portion of one of said motor coils of said plurality of motor coils, each of said first and second switch means being operable between a conducting condition and a nonconducting condition, means for effecting operation of a first one of said switch means of said first plurality of switch means and a first one of said switch means of said second plurality of switch means from the nonconducting condition to the conducting condition to effect energization of a first one of said motor coils under the influence of electrical current conducted through said first one of said first plurality of switch means and said first one of said second plurality of switch means, means for effecting operation of said first one of said first plurality of switch means from the conducting condition to the nonconducting condition while maintaining said first one of said second plurality of switch means in the conducting condition to establish a flow of electrical current from said first one of said plurality of motor coils back to said first one of said plurality of motor coils through said first one of said second plurality of switch means to thereby tend to maintain said first one of said plurality of motor coils energized with said first one of said first plurality of switch means in the nonconducting condition, and means for effecting operation of said first one of said second plurality of switch means from the conducting condition to the nonconducting condition after operation of said first one of said first plurality of switch means from the conducting condition to the nonconducting condition to interrupt the flow of current back to said first one of said plurality of motor coils.

21. A motor apparatus as set forth in claim 20 wherein said plurality of motor coils consists of only five motor coils disposed in the chamber in said housing.

22. A motor apparatus as set forth in claim 20 further including holding means for interrupting sequential energization of said plurality of motor coils and maintaining one of said motor coils in an energized condition to hold said rotor against movement relative to said stator with said first and second annular arrays of gear teeth in meshing engagement and with said first and second side surface areas in abutting engagement.

23. A motor apparatus as set forth in claim 20 wherein only a portion of said first and second annular arrays of gear teeth are disposed in meshing engagement at any one time, the area of abutting engagement between said annular side surface area on said housing and said annular side surface area on said rotor being disposed adjacent to and radially outwardly of the portion of said first and second annular arrays of gear teeth which are in meshing engagement.

24. A motor apparatus comprising a stator having a first annular array of gear teeth, a rotor having a second annular array of gear teeth, said rotor being movable relative to said stator between an initial orientation in which a central axis of said first and second annular arrays of gear teeth are coincident and a tilted orientation in which central axes of said first and second annular arrays of gear teeth are skewed relative to each other, said first and second annular arrays of gear teeth being spaced apart when said rotor is in the initial orientation, said first and second annular arrays of gear teeth being disposed in meshing engagement when said rotor is in the tilted orientation, a plurality of motor coils connected with said stator and sequentially energizeable to cause said rotor to move from the initial orientation to the tilted orientation and to cause said rotor to moved relative to said stator while said rotor is in the tilted orientation, said first and second annular arrays of gear teeth cooperating to effect rotation of said rotor relative to said stator from a first position toward a second position during movement of said rotor under the influence of said plurality of motor coils, control means for effecting sequential energization of said plurality of motor coils, holding means for rendering said control means ineffective to effect sequential energization of said motor coils and from maintaining one of said motor coils in an energized condition to maintain said rotor in the tilted orientation with said first and second annular arrays of gear teeth in meshing engagement to hold said rotor against rotation relative to said stator, and means for rendering said holding means ineffective to maintain said one of said motor coils in the energized condition to release said rotor for movement from the tilted orientation to the initial orientation, said control means includes a plurality of first switch means each of which is connected with a first end portion of one of said motor coils of said plurality of motor coils, a plurality of second switch means each of which is connected with a second end portion of one of said motor coils of said plurality of motor coils, each of said first and second switch means being operable between a conducting condition and a nonconducting condition, means for effecting operation of a first one of said switch means of said first plurality of switch means and a first one of said switch means of said second plurality of switch means from the nonconducting condition to the conducting condition to effect energization of a first one of said motor coils under the influence of electrical current conducted through said first one of said first plurality of switch means and said first one of said second plurality of switch means, means for effecting operation of said first one of said first plurality of switch means from the conducting condition to the nonconducting condition while maintaining said first one of said second plurality of switch means in the conducting condition to establish a flow of electrical current from said first one of said plurality of motor coils back to said first one of said plurality of motor coils through said first one of said second plurality of switch means to thereby tend to maintain said first one of said plurality of motor coils energized with said first one of said first plurality of switch means in the nonconducting condition, and means for effecting operation of said first one of said second plurality of switch means from the conducting condition to the nonconducting condition after operation of said first one of said first plurality of switch means from the conducting condition to the nonconducting condition to interrupt the flow of current back to said first one of said plurality of motor coils.

25. An apparatus as set forth in claim 24 further including biasing means for rotating said rotor relative to said stator from the second position back toward the first position while said rotor is in the initial orientation.

26. A motor apparatus as set forth in claim 25 wherein said stator includes a first annular side surface area which is coaxial with said first annular array of gear teeth, said rotor including a second annular side surface area which is coaxial with said second annular array of gear teeth, said first and second annular side surface areas being disposed in abutting engagement when said rotor is in the tilted orientation and being spaced apart when said rotor is in the initial orientation.

27. A motor apparatus as set forth in claim 25 wherein said plurality of motor coils consists of only five motor coils disposed in an annular array in said stator.

28. A motor apparatus comprising a stator having a first annular array of gear teeth, a rotor having a second annular array of gear teeth, said rotor being movable relative to said stator between an initial orientation in which a central axis of said first and second annular arrays of gear teeth are coincident and a tilted orientation in which central axes of said first and second arrays of gear teeth are skewed relative to each other, said first and second annular arrays of gear teeth being spaced apart when said rotor is in the initial orientation, said first and second annular arrays of gear teeth being disposed in meshing engagement when said rotor is in the tilted orientation, a plurality of motor coils connected with said stator and sequentially energizeable to cause said rotor to move from the initial orientation to the tilted orientation and to cause said rotor to moved relative to said stator while said rotor is in the tilted orientation, said plurality of motor coils consists of only five motor coils disposed in an annular array in said stator, control means for effecting sequential energization of said five motor coils to cause movement to said rotor relative to said stator with said rotor in the tilted orientation and with said first and second annular arrays of gear teeth in meshing engagement to effect rotation of said rotor relative to said stator, means for conducting electrical energy from said first one of said plurality of motor coils to a second one of said plurality of motor coils upon operation of said first one of said second plurality of switch means from the conducting condition to the nonconducting condition to at least partially effect energization of said second one of said motor coils under the influence of energy conducted from said first one of said motor coils.

29. A motor apparatus as set forth in claim 28 wherein said first and second annular arrays of gear teeth cooperate to effect rotation of said rotor relative to said stator from a first position toward a second position during movement of said rotor under the influence of said five motor coils, said apparatus further including biasing means for rotating said rotor relative to said stator from the second position back toward the first position while said rotor is in the initial orientation.

30. A motor apparatus as set forth in claim 28 wherein said stator includes a first annular side surface area which is coaxial with said first annular array of gear teeth, said rotor including a second annular side surface area which is coaxial with said second annular array of gear teeth, said first and second annular side surface areas being disposed in abutting engagement when said rotor is in the tilted orientation and being spaced apart when said rotor is in the initial orientation.

31. A motor apparatus as set forth in claim 28 further including capacitor means connected with said first one of said plurality of motor coils and said second one of said plurality of motor coils for temporarily storing electrical energy.

32. A motor apparatus as set forth in claim 31 wherein said control means includes a plurality of first switch means each of which is connected with a first end portion of one of said motor coils of said plurality of motor coils, a plurality of second switch means each of which is connected with a second end portion of one of said motor coils of said plurality of motor coils, each of said first and second switch means being operable between a conducting condition and a nonconducting condition, means for effecting operation of a first one of said switch means of said first plurality of switch means and a first one of said switch means of said second plurality of switch means from the nonconducting condition to the conducting condition to effect energization of a first one of said motor coils under the influence of electrical current conducted through said first one of said first plurality of switch means and said first one of said second plurality of switch means, means for effecting operation of said first one of said first plurality of switch means from the conducting condition to the nonconducting condition while maintaining said first one of said second plurality of switch means in the conducting condition to establish a flow of electrical current from said first one of said plurality of motor coils back to said first one of said plurality of motor coils through said first one of said second plurality of switch means to thereby tend to maintain said first one of said plurality of motor coils energized with said first one of said first plurality of switch means in the nonconducting condition, and means for effecting operation of said first one of said second plurality of switch means from the conducting condition to the nonconducting condition after operation of said first one of said first plurality of switch means from the conducting condition to the nonconducting condition to interrupt the flow of current back to said first one of said plurality of motor coils.

33. A motor apparatus comprising a stator, said stator including a metal housing having surface mans for at least partially defining a circular chamber having an open end portion and a first annular array of gear teeth which circumscribe the circular open end portion of said chamber, said housing having a first smooth annular side surface area which is coaxial with said first annular array of gear teeth, a metal rotor having a second annular array of gear teeth, said rotor having a second smooth annular side surface area which is coaxial with said second annular array of gear teeth, said first smooth annular side surface area being free of projections which extend toward said second smooth annular side surface area, said second smooth annular side surface area being free of projections which extend toward said first smooth annular side surface area, a plurality of motor coils disposed in said circular chamber in said hosing and sequentially energizeable to cause said rotor to move relative to said stator with said first and second annular arrays of gear teeth in meshing engagement and with said first and second smooth annular side surface areas in abutting engagement, said first and second annular arrays of gear teeth cooperating to effect rotation of said rotor relative to said stator during movement of said rotor under the influence of said plurality of motor coils, and control means for effecting sequential energization of said plurality of motor coils to move a magnetic flux field relative to said stator, said magnetic flux field being at least partially conducted between said stator and said rotor through an area of abutting engagement between said first and second smooth annular side surface areas.

34. A motor apparatus as set forth in claim 33 wherein said first smooth annular side surface area circumscribes the circular open end portion of said chamber, said second smooth annular side surface area being disposed on said rotor in axial alignment with said first smooth annular side surface area.

35. A motor apparatus as set forth in claim 33 wherein said first smooth annular side surface area is disposed radially outwardly of said first annular array of gear teeth and said second smooth annular side surface area is disposed radially outwardly of said second annular array of gear teeth.

36. A motor apparatus as set forth in claim 33 wherein said plurality of motor coils consists of only five motor coils disposed in the chamber in said housing.

37. A motor apparatus as set froth in claim 33 further including holding means for interrupting sequential energization of said plurality of motor coils and maintaining one of said motor coils in an energized condition to hold said rotor against movement relative to said stator with said first and second annular arrays of gear teeth in meshing engagement and with said first and second side surface areas in abutting engagement.

38. A motor apparatus as est forth in claim 37 wherein said control means includes a plurality of first switch means each of which is connected with a first end portion of one of said motor coils of said plurality of motor coils, a plurality of second switch means each of which is connected with a second end portion of one of said motor coils of said plurality of motor coils, each of said first and second switch means being operable between a conducting condition and a nonconducting condition, means for effecting operation of a first one of said switch means of said first plurality of switch means and a first one of said switch means of said second plurality of switch means from the nonconducting condition to the conducting condition to effect energization of a first one of said motor coils under the influence of electrical current conducted through said first one of said first plurality of switch means and said first one of said second plurality of switch means, means for effecting operation of said first one of said first plurality of switch means from the conducting condition to the nonconducting condition while maintaining said first one of said second plurality of switch means in the conducting condition to establish a flow of electrical current from said first one of said plurality of motor coils back to said first one of said plurality of motor coils through said first one of said second plurality of switch means to thereby tend to maintain said first one of said plurality of motor coils energized with said first one of said first plurality of switch means in the nonconducting condition, and means for effecting operation of said first one of said second plurality of switch means from the conducting condition to the nonconducting condition after operation of said first one of said first plurality of switch means from the conducting condition to the nonconducting condition to interrupt the flow of current back to said first one of said plurality of motor coils.

39. A motor apparatus as set forth in claim 33 wherein only a portion of said first and second annular arrays of gear teeth are disposed in meshing engagement at any one time, the area of abutting engagement between said first and second smooth annular side surface areas being disposed adjacent to and radially outwardly of the portion of said first and second annular arrays of gear teeth which are in meshing engagement.

40. A motor apparatus as set forth in claim 33 wherein said housing has an outer side wall which extends around said plurality of motor coils, said outer side wall of said housing having an end portion which is adjacent to said rotor, said first annular array of gear teeth and said first smooth annular side surface area being disposed on said end portion of said outer side wall of said housing.

41. A motor apparatus as set forth in claim 40 wherein said first smooth annular side surface area is disposed radially outwardly of said first annular array of gear teeth.

42. A motor apparatus comprising a stator, said stator including a housing have a side wall with surface means for at least partially defining a circular camber, a first annular array of gear teeth disposed on said side wall, and a first smooth annular side surface area disposed on side wall and coaxial with said first annular array of gear teeth, a rotor, said rotor having a second annular array of gear teeth and a second smooth annular side surface area which is coaxial with said second annular array of gear teeth, a plurality of motor coils disposed in said circular chamber and circumscribed by said first smooth annular side surface area and said first annular array of gear teeth, said plurality of motor coils being sequentially energizeable to cause said rotor to move relative to said stator with portions of said first and second annular arrays of gear teeth in meshing engagement and portions of said first and second smooth annular side surface areas in abutting engagement adjacent to and radially aligned with the portions of said first and second annular arrays of gear teeth which area in meshing engagement, said first and second annular arrays of gear teeth cooperating to effect rotation of said rotor relative to said stator during movement of said rotor under the influence of said plurality of motor coils, and control means for effecting sequential energization of said plurality of motor coils.

43. A motor apparatus as set forth in claim 42 wherein said control means includes means for interrupting sequential energization of said plurality of motor coils and for maintaining one of said motor coils sufficiently energized to hold said rotor stationary with said first and second annular arrays of gear teeth in meshing engagement and said first and second smooth annular side surface areas in abutting engagement.

44. A motor apparatus as set forth in claim 42 wherein said control means includes means for effecting de-energization of all of said motor coils to enable said rotor to move to an initial orientation in which said first and second annular arrays of gear teeth are spaced apart, said apparatus further including means for rotating said rotor relative to said stator with said rotor in the initial orientation.

45. A motor apparatus as set forth in claim 42 wherein said plurality of motor coils consists of only five motor coils.

46. A motor apparatus as set forth in claim 42 wherein said first and second annular arrays of gear teeth have an inside diameter which is at least as great as the diameter of the circular chamber in which said motor coils are disposed, said first smooth annular side surface area being disposed radially outwardly of said first annular array of gear teeth and said second smooth annular side surface area is disposed radially outwardly of said second annular array of gear teeth.

47. A motor apparatus as set forth in claim 42 wherein said first smooth annular side surface area is free of projections which extend toward said second smooth annular side surface area, said second smooth annular side surface area being free of projections which extend toward said first smooth annular side surface area.

48. A motor apparatus as set forth in claim 47 wherein said first smooth annular side surface area is disposed radially outwardly of said first annular array of gear teeth.

49. A motor apparatus comprising a stator having a first annular array of gear teeth, a rotor having a second annular array of gear teeth, a plurality of motor coils connected with said stator and sequentially energizeable to cause said rotor to move relative to said stator with said first and second annular arrays of gear teeth in meshing engagement, said first and second annular arrays of gear teeth cooperating to effect rotation of said rotor relative to said stator during movement of said rotor relative to said stator, control means for effecting sequential energization of said plurality of motor coils, said control means including a plurality of switch means each of which is connected with one of said motor coils of said plurality of motor coils, at least some of said switch means of said plurality of switch means being operable between a conducting condition and a nonconducting condition, and circuit means for effecting sequential operation of at least some of said switch means of said plurality of switch means from the nonconducting condition to the conducting condition to effect sequential energization of said motor coils under the influence of electrical current conducted through one of said switch means and for effecting sequential operation of at least some of said switch means of said plurality of switch means from the conducting condition to the nonconducting condition to effect sequential de-energization of each of said motor coils, said circuit means including means for sequentially maintaining at least one of said switch means of said plurality of switch means in the conducting condition for a first period of time upon sequential operation of at least some of said switch means to the conducting condition, and holding means for interrupting sequential energization of said plurality of motor coils and holding said rotor against movement relative to said stator with said first and second annular arrays of gear teeth in meshing engagement for a second period of time which is substantially longer than said first period of time, said holding means including means for repeatedly effecting operation of at least one of said switch means of said plurality of switch means between the conducting and nonconducting conditions during the second period of time.

50. A motor apparatus as set forth in claim 39 wherein said holding means includes means for maintaining energization of a first one of said motor coils under the influence of electrical current conducted through at least one of said switch means of said plurality of switch means during at least a portion of the second period of time, said circuit means including means to enable electrical current to flow from said first one of said motor coils back to said first one of said motor coils to thereby tend to maintain said first one of said motor coils energized during at least a portion of the second period of time.

51. A motor apparatus as set froth in claim 49 wherein said holding means includes means for maintaining motor coils other than said one of said motor coils in a de-energized condition during the second period of time.

52. A motor apparatus as set froth in claim 49 wherein said plurality of motor coils connected with said stator consists of only five coils.

53. A motor apparatus as set forth in claim 49 wherein said stator includes a first smooth annular surface area disposed in a coaxial relationship with said first annular array of gear teeth, said rotor including a second smooth annular surface area disposed in a coaxial relationship with said second annular array of gear teeth, said first and second smooth annular surface areas being disposed in abutting engagement during relative movement between said rotor and stator with said first and second annular arrays of gear teeth in meshing engagement and during holding of rotor against movement relative to said stator by said holding means.

54. A motor apparatus as set forth in claim 49 further including biasing means connected with said rotor for urging said rotor toward an initial position relative to said stator, said rotor being rotatable relative to said stator against the influence of said biasing means during sequential energization of said plurality of motor coils, said holding means being effective to hold said rotor against rotation relative to said stator under the influence of said biasing means upon interruption of sequential energization of said plurality of motor coils, said control means including means for rendering said holding means ineffective and de-energizing said plurality of motor coils to release said rotor for movement relative to said stator by said biasing means, said biasing means being operable to rotate said rotor back toward the initial position upon de-energization of said plurality of motor coils.

55. A motor apparatus as set forth in claim 49 further including means for conducting electrical energy from a first one of said plurality of motor coils to a second one of said plurality of motor coils to at least partially effect energization of said second one of said motor coils under the influence of energy conducted from said first one of said motor coils.

56. A motor apparatus as set forth in claim 49 wherein said means for repeatedly effecting operation of at least one of said switch means between the conducting and nonconducting conditions during the second period of time includes means for maintaining said one of said switch means in the conducting condition for a third period of time which is substantially less than said first period of time when said one of said switch means is operated to the conducting condition during repeated operation of said one of said switch means between the conducting and nonconducting conditions during the second period of time.

57. An apparatus comprising a member movable between a first position and a second position, a motor for moving said member between the first and second positions, said motor including a stator having a first annular array of gear teeth, a rotor connected with said member and having a second annular array of gear teeth, said rotor being rotatable in a first direction relative to said stator to effect movement of said member from the first position to the second position, said rotor being movable relative to said stator between an initial orientation in which a central axis of said first and second annular arrays of gear teeth are coincident and a tilted orientation in which central axes of said first and second annular arrays of gear teeth are skewed relative to each other, said first and second annular arrays of gear teeth being spaced apart when said rotor is in the initial orientation, said first and second annular arrays of gear teeth being disposed in meshing engagement when said rotor is in the tilted orientation, a plurality of motor coils connected with said stator and sequentially energizeable to cause said rotor to move relative to said stator while said rotor is in the tilted orientation, said first and second annular arrays of gear teeth cooperating top effect rotation of said rotor relative to said stator in the first direction during movement of said rotor under the influence of said plurality of motor coils, control means for effecting sequential energization of said plurality of motor coils with said rotor in the tilted orientation to effect rotation of said rotor in the first direction and movement of said member from the first position to the second position and for effecting de-energization of said plurality of motor coils and movement of said rotor from the tilted orientation to the initial orientation when said member is in the second position, and means for effecting movement of said member from the second position to the first position with said rotor in the initial orientation.

58. An apparatus as set forth in claim 57 wherein said means for effecting movement of said member from the second position to the first position with said rotor in the initial orientation includes means for effecting rotation of said rotor relative to said stator in a second direction opposite to the first direction during movement of said member from the second position to the first position with said rotor in the initial orientation.

59. An apparatus as set forth in claim 58 wherein said means for effecting movement of said member from the second position to the first position includes biasing means for applying to said member a force of sufficient magnitude to move said member from the second position to the first position and to rotate said rotor relative to said stator when said rotor is in the initial orientation.

60. An apparatus as set forth in claim 58 further including holding means for rendering said control means ineffective to effect sequential energization of said motor coils and for maintaining one of said motor coils in an energized condition to maintain said rotor in a tilted orientation with said first and second annular arrays of gear teeth in meshing engagement to hold said rotor against rotation and to hold said member in the second position against the influence of said means for effecting movement of said member from the second position to the first position.

61. A motor apparatus as set forth in claim 57 wherein said stator includes a first smooth annular side surface area which is coaxial with said first annular array of gear teeth, said rotor including a second smooth annular side surface area which is coaxial with said second annular array of gear teeth, said first smooth annular side surface area being free of projections which extend toward said second smooth annular side surface area, said second smooth annular side surface area being free of projections which extend toward said first smooth annular side surface area, said first and second smooth annular side surface areas being disposed in abutting engagement when said rotor is in the tilted orientation and being spaced apart when said rotor is in the initial orientation.

62. A motor apparatus as set forth in claim 57 wherein said plurality of motor coils consists of only five motor coils disposed in an annular array in said stator.

63. A motor apparatus comprising a stator having a first annular array of gear teeth, a rotor having a second annular array of gear teeth, said rotor being movable relative to said stator between an initial orientation in which a central axis of said first and second annular arrays of gear teeth are coincident and a tilted orientation in which central axes of said first and second arrays of gear teeth are skewed relative to each other, said first and second annular arrays of gear teeth being spaced apart when said rotor is in the initial orientation, said first and second annular arrays of gear teeth being disposed in meshing engagement when said rotor is in the tilted orientation, said stator including a first smooth annular side surface area which is coaxial with said first annular array of gear teeth, said rotor including a second smooth annular side surface area which is coaxial with said second annular array of gear teeth, said first smooth annular side surface area being free of projections which extend toward said second smooth annular side surface area, said second smooth annular side surface area being free of projections which extend toward said first smooth annular side surface area, said first and second smooth annular side surface areas being disposed in abutting engagement when said rotor is in the tilted orientation and being spaced apart when said rotor is in the initial orientation, a plurality of motor coils connected with said stator and sequentially energizeable to cause said rotor to move relative to said stator while said rotor is in the tilted orientation, said first and second annular arrays of gear teeth cooperating to effect rotation of said rotor relative to said stator from a first position toward a second position during movement of said rotor under the influence of said plurality of motor coils, control means for effecting sequential energization of said plurality of motor coils to rotate said rotor relative to said stator from the first position to the second position, and biasing means for rotating said rotor relative to said stator from the second position back toward the first position while said rotor is in the initial orientation.

64. A motor apparatus comprising a stator having a first annular array of gear teeth, a rotor having a second annular array of gear teeth, said rotor being movable relative to said stator between an initial orientation in which a central axis of said first and second annular arrays of gear teeth are coincident and a tilted orientation in which central axes of said first and second annular arrays of gear teeth are skewed relative to each other, said first and second annular arrays of gear teeth being spaced apart when said rotor is in the initial orientation, said first and second annular arrays of gear teeth being disposed in meshing engagement when said rotor is in the tilted orientation, a plurality of motor coils connected with said stator and sequentially energizeable to cause said rotor to move relative to said stator while said rotor is in the tilted orientation, said first and second annular arrays of gear teeth cooperating to effect rotation of said rotor relative to said stator from a first position toward a second position during movement of said rotor under the influence of said plurality of motor coils, control means for effecting sequential energization of said plurality of motor coils to rotate said rotor relative to said stator from the first position to the second position and biasing means for rotating said rotor relative to said stator from the second position back toward the first position while said rotor is in the initial orientation, said control means includes a plurality of first switch means each of which is connected with a first end portion of one of said motor coils of said plurality of motor coils, a plurality of second switch means each of which is connected with a second end portion of one of said motor coils of said plurality of motor coils, each of said first and second switch means being operable between a conducting condition and a nonconducting condition, means for effecting operation of a first one of said switch means of said first plurality of switch means and a first one of said switch means of said second plurality of switch means from the nonconducting condition to the conducting condition to effect energization of a first one of said motor coils under the influence of electrical current conducted through said first one of said first plurality of switch means and said first one of said second plurality of switch means, means for effecting operation of said first one of said first plurality of switch means from the conducting condition to the nonconducting condition while maintaining said first one of said second plurality of switch means in the conducting condition to establish a flow of electrical current from said first one of said plurality of motor coils back to said first one of said plurality of motor coils through said first one of said second plurality of switch means to thereby tend to maintain said first one of said plurality of motor coils energized with said first one of said first plurality of switch means in the nonconducting condition, and means for effecting operation of said first one of said second plurality of switch means from the conducting condition to the nonconducting condition after operation of said first one of said first plurality of switch means from the conducting condition to the nonconducting condition to interrupt the flow of current back to said first one of said plurality of motor coils.

65. A motor apparatus comprising a stator having a first annular array of gear teeth, a rotor having a second annular array of gear teeth, said rotor being movable relative to said stator between an initial orientation in which a central axis of said first and second annular arrays of gear teeth are coincident and a tilted orientation in which central axes of said first and second arrays of gear teeth are skewed relative to each other, said first and second annular arrays of gear teeth being spaced apart when said rotor is in the initial orientation, said first and second annular arrays of gear teeth being disposed in meshing engagement when said rotor is in the tilted orientation, said stator includes a first smooth annular side surface area which is coaxial with said first annular array of gear teeth, said rotor including a second smooth annular side surface area which is coaxial with said second annular array of gear teeth, said first smooth annular side surface area being free of projections which extend toward said second smooth annular side surface area, said second smooth annular side surface area being free of projections which extend toward said first smooth annular side surface area, said first and second smooth annular side surface areas being disposed in abutting engagement when said rotor is in the tilted orientation and being spaced apart when said rotor is in the initial orientation, a plurality of motor coils connected with said stator and sequentially energizeable to cause said rotor to move from the initial orientation to the tilted orientation and to cause said rotor to move relative to said stator while said rotor is in the tilted orientation, said plurality of motor coils consists of only five motor coils disposed in an annular array in said stator, and control means for effecting sequential energization of said five motor coils to cause movement of said rotor relative to said stator with said rotor in the tilted orientation and with said first and second annular arrays of gear teeth in meshing engagement to effect rotation of said rotor relative to said stator.

66. A motor apparatus comprising a stator having a first annular array of gear teeth, a rotor having a second annular array of gear teeth, said rotor being movable relative to said stator between an initial orientation in which a central axis of said first and second annular arrays of gear teeth are coincident and a tilted orientation in which central axes of said first and second arrays of gear teeth are skewed relative to each other, said first and second annular arrays of gear teeth being spaced apart when said rotor is in the initial orientation, said first and second annular arrays of gear teeth being disposed in meshing engagement when said rotor is in the tilted orientation, a plurality of motor coils connected with said stator and sequentially energizeable to cause said rotor to move from the initial orientation to the tilted orientation and to cause said rotor to move relative to said stator while said rotor is in the tilted orientation, said plurality of motor coils consists of only five motor coils disposed in an annular arrays in said stator, and control means for effecting sequential energization of said five motor coils to cause movement of said rotor relative to said stator with said rotor in the tilted orientation and with said first and second annular arrays of gear teeth in meshing engagement to effect rotation of said rotor relative to said stator, said control means including a plurality of first switch means each of which is connected with a first end portion of one of said motor coils of said plurality of motor coils, a plurality of second switch means each of which is connected with a second end portion of one of said motor coils of said plurality of motor coils, each of said first and second switch means being operable between a conducting condition and a nonconducting condition, means for effecting operation of a first one of said switch means of said first plurality of switch means and a first one of said switch means of said second plurality of switch means from the nonconducting condition to the conducting condition to effect energization of a first one of said motor coils under the influence of electrical current conducted through said first one of said first plurality of switch means and said first one of said second plurality of switch means, means for effecting operation of said first one of said first plurality of switch means from the conducting condition to the nonconducting condition while maintaining said first one of said second plurality of switch means in the conducting condition to establish a flow of electrical current from said first one of said plurality of motor coils back to said first one of said plurality of motor coils through said first one of said second plurality of switch means to thereby tend to maintain said first one of said plurality of motor coils energized with said first one of said first plurality of switch means in the nonconducting condition, and means for effecting operation of said first one of said second plurality of switch means from the conducting condition to the nonconducting condition after operation of said first one of said first plurality of switch means from the conducting condition to the nonconducting condition to interrupt the flow of current back to said first one of said plurality of motor coils.

* * * * *

UNITED STATES PATENT AND TRADEMARK OFFICE
CERTIFICATE OF CORRECTION

PATENT NO. : 5,338,993
DATED : August 16, 1994
INVENTOR(S) : Edward R. Briggs, Gary H. Daebelliehn, Peter S. Winzen and Donald R. Bellgraph It is certified that error appears in the above-indentified patent and that said Letters Patent is hereby corrected as shown below:

Column 22, line 47, change "mans" to --means--.

Column 22, line 61, after "second" insert --side surface areas in abutting engagement, said first and second--.

Column 24, line 7, change "moved" to --move.

Column 24, line 16, change "from" to --for--.

Column 25, line 28, change "to" (second occurance) to --of--.

Column 26, line 34, change "mans" to --means--.

Column 26, line 50, change "hosing" to --housing--.

Column 27, line 12, change "froth" to --forth--.

Column 27, line 20, change "est" to --set--.

Column 28, line 9, change "have" to --having--.

Column 28, line 10, change "camber" to --chamber--.

Column 28, line 13, before "side" insert --said--.

Column 28, line 27, change "area" to --are--.

Column 29, line 47, change "39" to --49--.

Column 29, line 59, change "froth" to --forth--.

Column 29, line 64, change "froth" to --forth--.

UNITED STATES PATENT AND TRADEMARK OFFICE
CERTIFICATE OF CORRECTION

PATENT NO. : 5,338,993
DATED : August 16, 1994
INVENTOR(S) : Edward R. Briggs, Gary H. Daebelliehn, Peter S. Winzen and Donald R. Bellgraph It is certified that error appears in the above-indentified patent and that said Letters Patent is hereby corrected as shown below:

Column 31, line 2, change "top" to --to--.

Column 31, line 66, after "second" insert --annular--.

Column 34, line 21, change "arrays" to --array--.

Signed and Sealed this

Eleventh Day of April, 1995

Attest:

BRUCE LEHMAN

*Attesting Officer*     *Commissioner of Patents and Trademarks*